United States Patent
Zhang et al.

(10) Patent No.: US 12,276,187 B2
(45) Date of Patent: Apr. 15, 2025

(54) CONNECTION DEVICE, CONTROL BOX COMPONENT AND FRACTURING APPARATUS

(71) Applicant: YANTAI JEREH PETROLEUM EQUIPMENT & TECHNOLOGIES CO., LTD., Shandong (CN)

(72) Inventors: Peng Zhang, Shandong (CN); Rikui Zhang, Shandong (CN); Liang Lv, Shandong (CN); Xiaolei Ji, Shandong (CN); Chunqiang Lan, Shandong (CN); Yipeng Wu, Shandong (CN); Xincheng Li, Shandong (CN); Yuxuan Sun, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

(21) Appl. No.: 18/434,348

(22) Filed: Feb. 6, 2024

(65) Prior Publication Data
US 2024/0175342 A1 May 30, 2024

Related U.S. Application Data

(63) Continuation of application No. 17/867,387, filed on Jul. 18, 2022, now Pat. No. 11,891,885, which is a
(Continued)

(30) Foreign Application Priority Data

Jan. 26, 2021 (CN) .......................... 202110101567.8
Sep. 10, 2021 (CN) .......................... 202122186195.1

(51) Int. Cl.
E21B 43/26 (2006.01)
A62C 35/00 (2006.01)
(Continued)

(52) U.S. Cl.
CPC .......... *E21B 43/2607* (2020.05); *E21B 35/00* (2013.01); *E21B 43/26* (2013.01);
(Continued)

(58) Field of Classification Search
CPC ..... E21B 43/26; E21B 43/2607; F01M 5/002; F02C 7/06; F02C 7/32; F02C 7/20
See application file for complete search history.

(56) References Cited

U.S. PATENT DOCUMENTS 10,407,990 B2 9/2019 Oehring et al.
10,865,624 B1 12/2020 Cui et al.
(Continued)

FOREIGN PATENT DOCUMENTS

| CN | 102602323 A | 7/2012 |
| CN | 207752603 U | 8/2018 |

(Continued)

OTHER PUBLICATIONS

Notice of Allowance mailed Sep. 15, 2023 for U.S. Appl. No. 17/691,632.
(Continued)

*Primary Examiner* — Shane Bomar
(74) *Attorney, Agent, or Firm* — Crowell & Moring LLP

(57) ABSTRACT

A fracturing device includes a power unit, and the power unit includes a muffling compartment, a turbine engine, and an air intake unit. The air intake unit is communicated with the turbine engine through an intake pipe and configured to provide a combustion-supporting gas to the turbine engine; the air intake unit is at a top of the muffling compartment and the muffling compartment has an accommodation space, the turbine engine is within the accommodation space. A fan is further provided to generate wither positive pressure or negative presser in the muffling compartment to facilitate a cooling of the turbine engine.

20 Claims, 14 Drawing Sheets

Related U.S. Application Data continuation-in-part of application No. 17/691,632, filed on Mar. 10, 2022, now Pat. No. 11,873,704, which is a continuation-in-part of application No. 17/398,375, filed on Aug. 10, 2021, now Pat. No. 11,668,173, which is a continuation of application No. 17/172,819, filed on Feb. 10, 2021, now Pat. No. 11,143,006.

(51) Int. Cl.
*E21B 35/00* (2006.01)
*F01M 1/00* (2006.01)
*F01M 5/00* (2006.01)
*F02C 7/06* (2006.01)
*F02C 7/24* (2006.01)
*F02C 7/32* (2006.01)
*F16N 7/00* (2006.01)

(52) U.S. Cl.
CPC ............... *F02C 7/06* (2013.01); *F02C 7/24* (2013.01); *F02C 7/32* (2013.01); *A62C 35/00* (2013.01); *F01M 1/00* (2013.01); *F01M 5/002* (2013.01); *F05D 2260/98* (2013.01); *F16N 7/00* (2013.01)

(56) References Cited

U.S. PATENT DOCUMENTS

| | | | |
|---|---|---|---|
| 10,865,631 B1 | 12/2020 | Zhang et al. | |
| 10,914,155 B2 | 2/2021 | Oehring | |
| 10,954,855 B1 | 3/2021 | Ji et al. | |
| 10,961,993 B1 | 3/2021 | Ji et al. | |
| 11,242,737 B2 | 2/2022 | Zhang | |
| 11,255,173 B2 | 2/2022 | Coli | |
| 11,359,462 B2 | 6/2022 | Morris | |
| 11,391,136 B2 | 7/2022 | Coli | |
| 11,408,417 B1 | 8/2022 | Stephenson | |
| 11,891,885 B2 * | 2/2024 | Zhang | F02C 7/36 |
| 2010/0000508 A1 | 1/2010 | Chandler | |
| 2014/0048268 A1 | 2/2014 | Chandler | |
| 2018/0266412 A1 | 9/2018 | Stokkevåg et al. | |
| 2020/0109616 A1 | 4/2020 | Oehring | |
| 2020/0206651 A1 | 7/2020 | Frick | |
| 2020/0332784 A1 | 10/2020 | Zhang et al. | |
| 2020/0400005 A1 | 12/2020 | Han et al. | |
| 2021/0071579 A1 | 3/2021 | Li et al. | |
| 2021/0086851 A1 | 3/2021 | Zhang et al. | |
| 2021/0087883 A1 | 3/2021 | Zhang et al. | |
| 2021/0087916 A1 | 3/2021 | Zhang et al. | |
| 2021/0088042 A1 | 3/2021 | Zhang et al. | |
| 2021/0396122 A1 | 12/2021 | Yeung | |
| 2022/0127944 A1 | 4/2022 | Chapman | |
| 2023/0139271 A1 | 5/2023 | Crowe | |
| 2023/0142057 A1 | 5/2023 | Bloschies | |
| 2023/0235653 A1 | 7/2023 | Publes et al. | |
| 2023/0296050 A1 | 9/2023 | Yeung et al. | |
| 2023/0358127 A1 | 11/2023 | Tian et al. | |

FOREIGN PATENT DOCUMENTS

| | | |
|---|---|---|
| CN | 109882144 A | 6/2019 |
| CN | 110005085 A | 7/2019 |
| CN | 110469654 A | 11/2019 |
| CN | 110485983 A | 11/2019 |
| CN | 112780245 A | 5/2021 |

OTHER PUBLICATIONS

Final Office Action mailed Mar. 6, 2024 for U.S. Appl. No. 18/456,180.

* cited by examiner

Note for components label: add prefix of "2-" to each of the labels.

Note for components label: add prefix of "2-" to each of the labels.

CONNECTION DEVICE, CONTROL BOX COMPONENT AND FRACTURING APPARATUS

CROSS REFERENCE TO RELATED APPLICATIONS

This application is a continuation application of U.S. Ser. No. 17/867,387 filed on Jul. 18, 2022, which is a continuation in part application of U.S. Ser. No. 17/691,632, filed on Mar. 10, 2022, which is a continuation in part application of U.S. Ser. No. 17/398,375 filed on Aug. 10, 2021 which is a continuation application of U.S. Ser. No. 17/172,819 filed on Feb. 10, 2021, which claims priority of Chinese Patent Application CN 202110101567.8, filed on Jan. 26, 2021. The U.S. Ser. No. 17/691,632 application also claims priority under 35 U.S.C. 119 from the Chinese Patent Application CN 202122186195.1, filed on Sep. 10, 2021. The disclosures of all of these applications are hereby incorporated by reference in their entirety.

TECHNICAL FIELD

Embodiments of the present disclosure relate to a connection device, a control box component, and other aspects of a fracturing apparatus.

BACKGROUND

Recently, as the demand for unconventional natural gas, such as shale gas, has grown, the demand for fracturing apparatus has also substantially grown. The fracturing apparatus usually includes a power device, a transmission component and a control box, etc. In some fracturing apparatus, the transmission component and the control box are close to each other in position, and it is difficult for the maintenance operation of the transmission component.

SUMMARY

The present disclosure relates to a connection device, a control box component, and a fracturing apparatus. In some example implementations, a connection device for connecting a control box of a fracturing apparatus with a mounting base of the fracturing apparatus is disclosed. The fracturing apparatus may include a transmission component. The transmission component may include a transmission shaft. The connection device may include a fixation rack, configured to be fixedly connected with the mounting base; a box connection mechanism, configured to be connected with the control box, and drive the control box to move at least from a first position to a second position relative to the fixation rack. When the connection device is connected with the mounting base and the control box is located at the first position, the control box may be located at a side of the transmission component in a direction perpendicular to an axis of the transmission shaft and a distance between the control box and the transmission component may be less than a predetermined distance. During the control box being moved from the first position to the second position, the control box may be away from the transmission component to form an operation space for the transmission component at the first position.

In the implementation above, the box connection mechanism may be configured to drive the control box to rotate at least between the first position and the second position. The control box may have a first surface, and in a case that the control box is located at the first position, the first surface may face the transmission component. During the control box being moved from the first position to the second position, an included angle between the first surface and the axis of the transmission shaft may increase gradually.

In any of the implementations above, the box connection mechanism may be configured to drive the control box to move at least between the first position and the second position. The control box may have a first surface, and in a case that the control box is located at the first position, the first surface may face the transmission component. During the control box being moved from the first position to the second position, a distance between the first surface and the axis of the transmission shaft may increase gradually.

In any of the implementations above, the fixation rack may include a first fixation bracket and a second fixation bracket, each of which is configured to have a first end fixedly connected with the mounting base and a second end extending in a first direction relative to the first end; and a fixation shaft, configured to have a first end fixedly connected with the first fixation bracket and a second end extending in a second direction relative to the first end, and the fixation shaft is rotatably connected with the box connection mechanism. When the connection device is connected with the mounting base, any two of the first direction, the second direction and the axis of the transmission shaft may be perpendicular to each other.

In any of the implementations above, the box connection mechanism may include a support fame, comprising a bottom frame and a vertical frame fixedly connected with the bottom frame, wherein a plane where the bottom frame is located is parallel with a plane formed by the first direction and the axis of the transmission shaft. When the box connection mechanism is located at the first position, two sides of the bottom frame may lap on the first fixation bracket and the second fixation bracket, respectively. The vertical frame may be located at a side of the bottom frame away from the first fixation bracket and the second fixation bracket, and the vertical frame may be configured to be connected with the control box. The box connection mechanism may further include a rotation shaft configured to have a first end fixedly connected with the support frame and a second end extending to the second direction relative to the first end. The rotation shaft may be rotatably connected with the fixation shaft.

In any of the implementations above, the control box may include a first control box and a second control box, and the first control box and the second control box may be connected with two sides of the vertical fame, respectively. The support frame may further include a first vertical rod and a second vertical rod connected with the two sides of the vertical frame. The first vertical rod may be configured to be connected with the first control box, and the second vertical rod may be configured to be connected with the second control box.

In any of the implementations above, the fixation shaft may be located at the second end of the first fixed bracket.

In any of the implementations above, the connection device may further include a first limitation component, which may include a first limitation structure and a second limitation structure, wherein the first limitation structure is disposed on the support frame, the second limitation structure is disposed on the second fixation bracket, and the first limitation structure and the second limitation structure cooperate with each other to lock the control box at the first position.

In any of the implementations above, the connection device my further include a second limitation component, which may include a third limitation structure and a fourth limitation structure, wherein the third limitation structure is disposed on the support frame, the fourth limitation structure is disposed on the first fixation bracket, and the third limitation structure and the fourth limitation structure cooperate with each other to lock the control box at the second position.

In any of the implementations above, the connection device my further include at least one shock absorber, configured to be connected between the support frame and the control box. The at least one shock absorber may include a first shock absorber and a second shock absorber, the first shock absorber is configured to be connected between the first vertical rod and the first control box and/or between the second vertical rod and the second control box. The second shock absorber may be configured to be connected between the bottom frame and the control box. The shock absorber may include a vibration isolator.

In any of the implementations above, a surface of the first fixation bracket towards the second direction may be provided with a first pad plate. The first pad plate may be configured to be lapped with the support frame. The first pad plate may extend in the first direction. A thickness of a side of the first pad plate facing the second fixation bracket may be less than a thickness of a side of the first pad plate away from the second fixation bracket, to form a first inclined surface on the first pad plate.

In any of the implementations above, a surface of the second fixation bracket towards the second direction may be provided with a second pad plate. The second pad plate may be configured to be lapped with the support frame. The second pad plate may extend in the first direction. A thickness of a side of the first pad plate close to the first end of the second fixation bracket may be larger than a thickness of a side of the second pad plate close to the second end of the second fixation bracket, to form a second inclined surface on the second pad plate.

In any of the implementations above, the first fixation bracket may be provided with a via hole running through the first fixation bracket in a direction of the axis of the transmission shaft, for a cable running through the via hole to be connected with the control box.

In some other implementations, a control box component is disclosed. The control box component may include a control box, and the connection device any of the implementations above. The control box may be connected to the connection device.

In the implementations above, the fixation rack may include a first fixation bracket and a second fixation bracket, each of which may be configured to have a first end fixedly connected with the mounting base and a second end extending in a first direction relative to the first end. The fixation rack may further include a fixation shaft, configured to have a first end fixedly connected with the first fixation bracket and a second end extending in a second direction relative to the first end, and the fixation shaft is rotatably connected with the box connection mechanism. When the connection device is connected with the mounting base, any two of the first direction, the second direction and the axis of the transmission shaft may be perpendicular to each other.

In any of the implementations above, the box connection mechanism may include a support fame, which may include a bottom frame and a vertical frame fixedly connected with the bottom frame, wherein a plane where the bottom frame is located is parallel with a plane formed by the first direction and the axis of the transmission shaft. When the box connection mechanism is located at the first position, two sides of the bottom frame may lap on the first fixation bracket and the second fixation bracket, respectively. The vertical frame may be located at a side of the bottom frame away from the first fixation bracket and the second fixation bracket, and the vertical frame may be configured to be connected with the control box. The box connection mechanism may further include a rotation shaft, configured to have a first end fixedly connected with the support frame and a second end extending to the second direction relative to the first end, and the rotation shaft being rotatably connected with the fixation shaft.

In any of the implementations above, the control box may include a first control box and a second control box, and the first control box and the second control box are connected with two sides of the vertical fame, respectively. The support frame may further include a first vertical rod and a second vertical rod connected with the two sides of the vertical frame. The first vertical rod may be configured to be connected with the first control box, and the second rod maybe configured to be connected with the second control box.

In some other implementations, a fracturing apparatus is disclosed. The fracturing apparatus may include a mounting base, a transmission component, a control box, and the connection device of any of the implementations above. The control box may be connected to the mounting base through the connection device.

In any of the implementations above, the box connection mechanism may be configured to drive the control box to rotate at least between the first position and the second position. The control box may have a first surface, and when the control box is located at the first position, the first surface may face the transmission component. During the control box being moved from the first position to the second position, an included angle between the first surface and the axis of the transmission shaft may increase gradually.

In any of the implementations above, the box connection mechanism may be configured to drive the control box to move at least between the first position and the second position. The control box may have a first surface, and when the control box is located at the first position, the first surface may face the transmission component. During the control box being moved from the first position to the second position, a distance between the first surface and the axis of the transmission shaft may increase gradually.

BRIEF DESCRIPTION OF THE DRAWINGS

In order to clearly illustrate the technical solution of embodiments of the present disclosure, the drawings of the embodiments will be briefly described in the following. It is obvious that the drawings in the description are only related to some embodiments of the present disclosure and not limited to the present disclosure.

DETAILED DESCRIPTION

In order to make objects, technical details and advantages of the embodiments of the invention apparent, the technical solutions of the embodiment will be described below in connection with the drawings related to the embodiments of the invention. It is obvious that the described embodiments are just a part but not all of the embodiments of the invention. Based on the described embodiments herein, those having ordinary skill in the art can obtain other embodiment(s), without any inventive work, which should be within the scope of the invention.

Unless otherwise defined, the technical terminology or scientific terminology used herein should have the general meanings understood by those skills in the art to which the present invention belongs. The "first", "second" and similar words used in the present invention application specification and claims do not mean any sequence, amount or importance, but are merely used to distinguish different components. Likewise, "a" or "an" or similar words do not mean the limitation to amount, instead, it refers to at least one. The word "comprise", "include" or the like only indicates that an element or a component before the word contains elements or components listed after the word and equivalents thereof, not excluding other elements or components. "Connecting" or "connected" and similar words are not limited to the physical or mechanical connection, but may comprise electrical connection, no matter directly or indirectly. The words "on", "beneath", "left", "right" and the like only indicate the relative position relationship which is correspondingly changed when the absolute position of a described object is changed.

Figure 1:
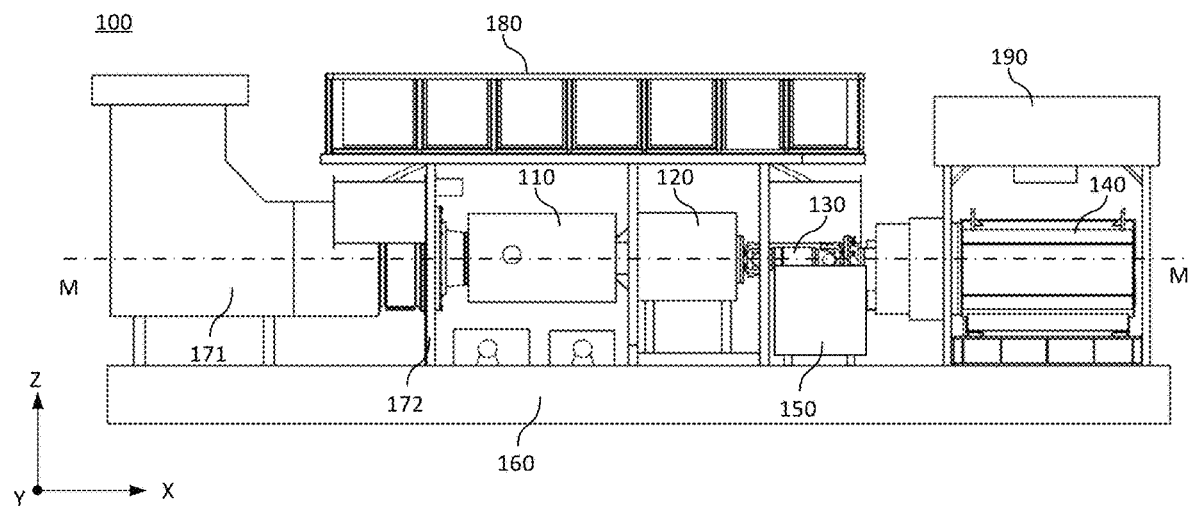
FIG. 1 illustrates a schematic structural diagram of a fracturing apparatus.

FIG. 1 illustrates a schematic structure diagram of a fracturing apparatus. As illustrated in FIG. 1, the fracturing apparatus 100 includes a power device 100, a reducer 120, a transmission shaft 130 and a plunger pump 140 which are connected in sequence. The power device 100 can adopt a turbine engine, the reducer 120 can function to match rotational speed, etc., and the transmission shaft can transfer power of the reducer 120 to the plunger pump, to drive the plunger pump to operate. The transmission shaft 130 can include a coupling, and the coupling can connect an output shaft of the reducer with an input shaft of the plunger pump. A peripheral of the transmission shaft 130 can be provided with a transmission shaft protection mask (not illustrated), the transmission shaft protection mask encloses at least a partial region of the transmission shaft. For example, the transmission shaft protection mask can enclose the transmission shaft 130 by 360 degrees. Alternatively, the transmission shaft protection mask can cover merely two sides of the transmission shaft 130. The transmission shaft protection mask can have a shape of circle, arc, square, polygon, etc., and the shape and dimension of the transmission shaft protection mask can be designed under actual requirements, which is not limited in the embodiments of the disclosure. The transmission shaft protection can protect the transmission shaft 130 and isolate the transmission shaft 130 operated in high speed from an operator and other objects.

For example, the fracturing apparatus 100 can further includes a control box 150, electrical control elements (for example, a controller, etc.) can be provided in the control box 150, the electrical control elements can be connected with a plurality of kinds of sensors provided on the fracturing apparatus to acquire a plurality of kinds of sensed data, and can further control and adjust corresponding devices of the fracturing apparatus 100 based on the sensed data. The plurality of kinds of the sensors can include a temperature sensor, a smoke sensor, etc., for example.

For example, the control box 150 and the transmission shaft protection mask are close to each other in position, and the transmission shaft protection mask is shielded, which cause difficulty for the maintenance of the transmission shaft protection mask or the transmission shaft.

At least one embodiment of the present disclosure provides a connection device, a control box component and a fracturing apparatus. The connection device is configured to connect a control box of a fracturing apparatus with a mounting base of the fracturing apparatus. The fracturing apparatus further includes a transmission component, and the transmission component includes a transmission shaft. The connection device includes: a fixation rack, configured to be fixedly connected with the mounting base; a box connection mechanism, configured to be connected with the control box and drive the control box to move at least from a first position to a second position relative to the fixation rack. In a case that the connection device is connected with the mounting base and the control box is located at the first position, the control box is located at a side of the transmission component in a direction perpendicular to an axis of the transmission shaft, and a distance between the control box and the transmission component is less than a predetermined distance. During the control box being moved from the first position to the second position, the control box is moved away from the transmission component, to form an operation space for the transmission component at the first position. In a state of the fracturing apparatus in a normal operation, the connection device can make the control box located at the first position, so that the respective parts of the fracturing apparatus can be more compact. In a case that the transmission component is required to be maintained, the control box can be moved to the second position, so that a region is empty as an operation space at a side of the transmission component, which is convenient for an operator to maintain the transmission component in the operation space.

Figure 2:
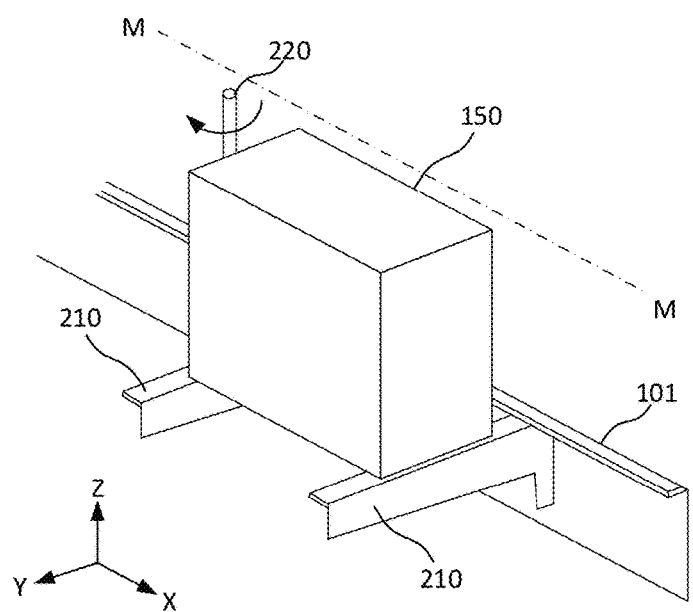
FIG. 2 illustrates a schematic diagram of a connection between a connection device and a control box according to at least one embodiment of the present disclosure.

FIG. 2 illustrates a schematic diagram of a connection between the connection device and the control box according to at least one embodiment of the present disclosure.

As illustrated in FIGS. 1 and 2, the connection device is configured to connect the control box 150 of the fracturing apparatus with the mounting base 101 of the fracturing apparatus. The fracturing apparatus further includes a transmission component, and the transmission component includes the transmission shaft 130. In addition, the transmission component can further include a transmission shaft protection mask.

For example, the connection device can include a fixation rack 210 and a box connection mechanism 220 connected with the fixation rack 210. The fixation rack 210 is configured to be fixedly connected with the mounting base 101. The box connection mechanism 220 is configured to be connected with the control box 150 and drive the control box 150 to move at least from a first position to a second position relative to the fixation rack 210. In a case that the connection device is connected with the mounting base 101 and the control box 150 is located at the first position, the control box 150 is located at a side of the transmission component in a direction perpendicular to an axis M-M of the transmission shaft 130 (i.e. a direction perpendicular to direction X) and a distance between the control box 150 and the transmission shaft is less than a predetermined distance. During the box connection mechanism 220 being moved from the first position to the second position, the control box 150 is moved away from the transmission component, to form an operation space for the transmission component at the first position.

For example, the control box as illustrated in FIG. 2 is located at the first position. In this state, the control box 150 and the transmission component are arranged in the direction Y. That is, the control box 150 is located at a side of the transmission component in the direction Y, and the direction Y is perpendicular to the direction of the axis M-M of the transmission shaft 130 (the direction X). The distance between the control box 150 and the transmission shaft (for example, a distance between the control box 150 and the transmission shaft protection mask) is less a predetermined distance. That is, the distance between the control box 150 and the transmission component is relatively small. For example, the predetermined distance can be in a range from 0.1 m (meter) to 0.5 m (meter), which can be determined under actual requirements and is not limited by the embodiments of the disclosure. This arrangement can make the respective parts of the fracturing apparatus more compact and occupy less space. However, the control box 150 may shield the transmission component, which is not convenient to maintain the transmission component.

Figure 3:
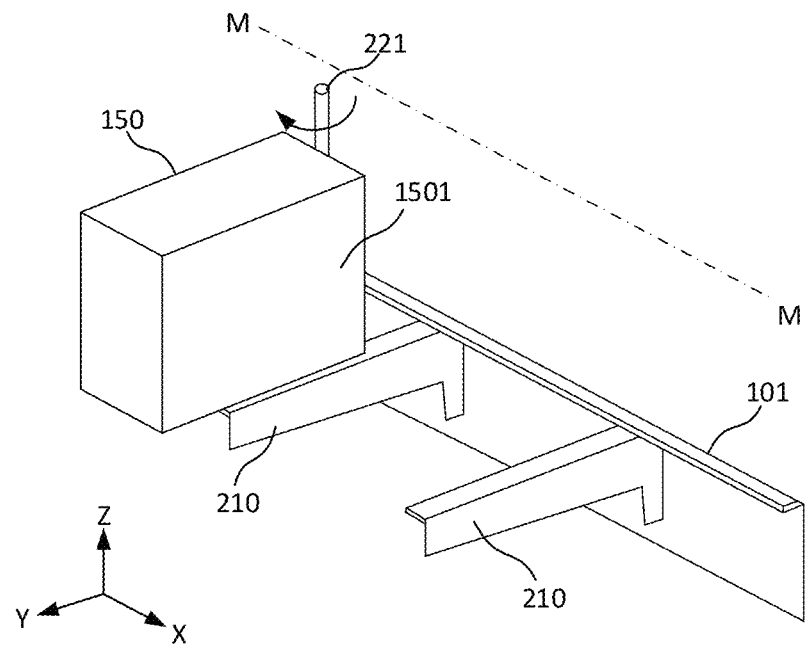
FIG. 3 illustrates a schematic diagram of the control box located at a second position according to at least one embodiment of the present disclosure.

FIG. 3 illustrates a schematic diagram of the control box located at the second position according to at least one embodiment of the present disclosure.

As illustrated in FIG. 3, in one example, the box connection mechanism can be configured to drive the control box 150 to move at least between the first position and the second position. For example, the box connection mechanism can include a rotation shaft 221. The rotation shaft 221 can be rotatably connected with the fixation rack 210, and the rotation shaft 221 can be located on a side of the control box 150 and is fixedly connected with the control box 150. The rotation shaft 221 can be rotated along with the control box 15 from the first position as illustrated in FIG. 2 to the second position as illustrated in FIG. 3, around an axis Z.

For example, the control box 150 has a first surface 1501 (that is, a back face of the control box 150 as illustrated in FIGS. 1 and 2). In a case that the control box is located at the first position, the first surface 1501 faces the transmission component, and the first surface 1501 is parallel with the axis M-M of the transmission shaft. That is, an included angle between the first surface and the axis M-M of the transmission shaft is substantially 0 degree. As illustrated in FIGS. 2 and 3, during the control box 150 being moved from the first position to the second position, the included angle between the first surface 1501 and the axis M-M of the transmission shaft increases gradually. When the control box 150 is moved to the second position, the included angle between the first surface and the axis M-M of the transmission shaft is 90 degrees, for example. In this way, when the fracturing apparatus is in a normal operation, the control box 150 can be located at the first position, so that the respective parts of the fracturing apparatus can be more compact. When the transmission component is required to be maintained, the control box 150 can be rotated to the second position, so that an open can be formed on a side of the transmission component and a region is empty as an operation space, which is convenient for an operator to maintain the transmission component. When the maintenance operation to the transmission component is completed, the control box 150 can be moved back to the first position.

Figure 4:
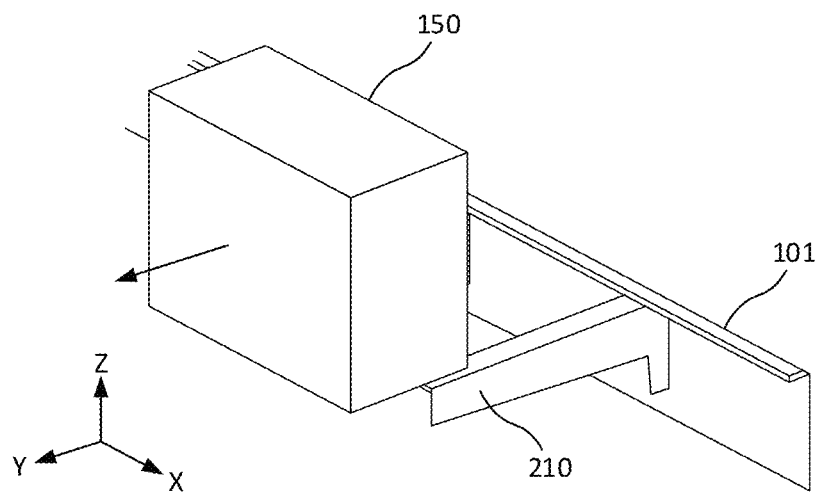
FIG. 4 illustrates another schematic diagram of the control box located at the second position according to at least one embodiment of the present disclosure.

FIG. 4 illustrates another schematic diagram of the control box located at the second position according to at least one embodiment of the present disclosure.

As illustrated in FIG. 4, in another example, the box connection mechanism can be configured to drive the control box 150 to move between the first position and the second position. For example, the box body connection structure can include a slide rail and a slide block (not illustrated). One of the slide rail and the slide block can be provided on a bottom of the control box 150, and the other one of the slide rail and the slide block can be provided on the fixation rack 210. The control box 150 can be moved forward and backward relative to the fixation rack 210, i.e. in the direction Y, under the cooperation of the slide rail and the slide block.

For example, as discussed above, the control box 150 has a first surface 1501 (that is, a back face of the control box 150 as illustrated in FIGS. 1 and 2). In a case that the control box 150 is located at the first position, the first surface 1501 faces the transmission component, and the first surface 1501 has a first vertical distance from the axis M-M of the transmission shaft. The first vertical distance is less than the above predetermined distance. During the control box being moved from the first position as illustrated in FIG. 2 to the second position as illustrated in FIG. 4, the vertical distance of the first surface 1501 from the axis M-M of the transmission shaft increases gradually. For example, when the control box is moved to the second position, the first vertical distance of the first surface from the axis M-M of the transmission shaft increases to a second vertical distance. The second vertical distance can be larger than the predetermined distance. The second vertical distance can be determined under actual requirements which is not limited by embodiments of the disclosure. In this way, when the fracturing apparatus is in a normal operation, the control box 150 can be located at the first position, so that the respective parts of the fracturing apparatus can be more compact. In a case that the transmission component is required to be maintained, the control box 150 can be moved forward to the second position, so that the distance between the control box 150 and the transmission component increases and a region is empty as an operation space in the direction Y of the transmission component, which is convenient for an operator to maintain the transmission component. When the maintenance operation to the transmission component is completed, the control box 150 can be moved back to the first position.

Hereinafter, an example in which the box connection mechanism drives the control box 150 to rotate is illustrated for further explanation.

Figure 5:
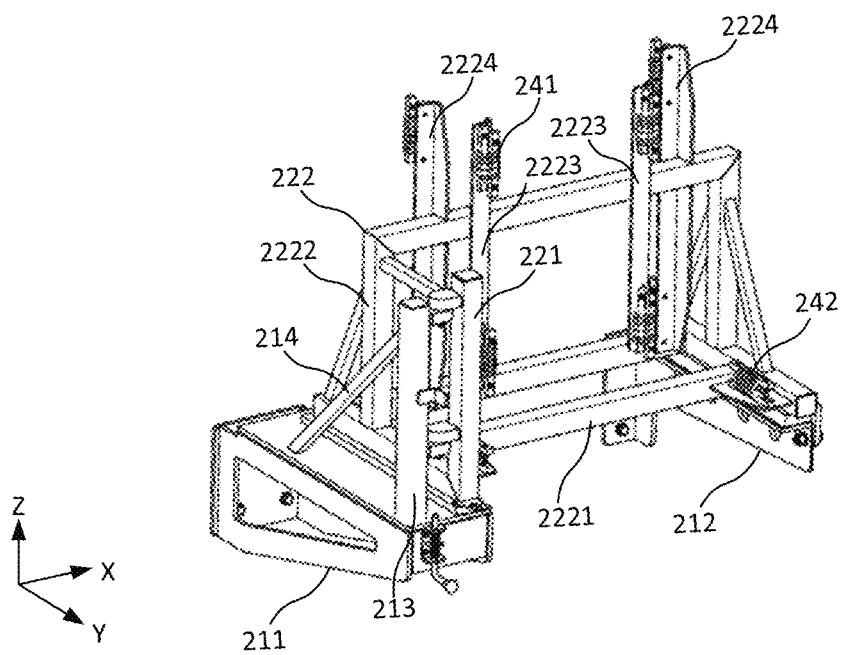
FIG. 5 illustrates a schematic diagram of a fixation rack and a box connection mechanism according to at least one embodiment of the present disclosure.

FIG. 5 illustrates a schematic diagram of a fixation rack and a box connection mechanism according to at least one embodiment of the present disclosure.

As illustrated in FIG. 5, the fixation rack includes a first fixation bracket 211, a second fixation bracket 212 and a fixation shaft 213.

For example, each of the first fixation bracket 211 and the second fixation bracket 212 is configured to be connected with the mounting base at its first end and have a second end extending in a first direction relative to the first end. For example, the second end extending in the first direction relative to the first end can be understood as a connection line of the second end and the first end extending in the first direction. That is, the connection line of the second end and the first end is parallel with the first direction. In FIG. 5, each of the first fixation bracket 211 and the second fixation bracket 212 has its back end be fixedly connected with the mounting base of the fracturing apparatus, and extends forwards from the back end in the direction Y.

For example, a first end of the fixation shaft 213 is fixedly connected with the first fixation bracket 211. A second end of the fixation shaft 213 extends in a second direction relative to the first end of the fixation shaft (a connection line of the second end of the fixation shaft 2133 and the first end of the fixation shaft 2133 is parallel with the second direction). The fixation shaft 213 is rotatably connected with the box connection mechanism. For example, as illustrated in FIG. 5, a bottom end of the fixation shaft 213 is fixed with the first fixation bracket 211 together, and a top end of the fixation shaft 213 extends upwards in a direction Z.

For example, in a case that the connection device is connected with the mounting base, any two of the first direction (i.e. the direction Y), the second direction (i.e. the direction Z) and an axis of the transmission shaft (i.e. the direction X) are perpendicular to each other.

For example, the fixation rack can include a support rod 214. The support rod 214 is inclinedly connected between the first fixation bracket 211 and the fixation shaft 213, to form a fixation structure in a shape of triangular with the first fixation bracket 211 and the fixation shaft 213.

For example, the box connection mechanism can include a support frame 222 and a rotation shaft 221.

For example, the support frame 222 includes a bottom frame 2221 and a vertical frame 2222 fixedly connected with the bottom frame 2221. A plane where the bottom frame 2221 is located is parallel with a plane formed by the first direction and the axis of the rotation shaft (i.e. the plane XY). In a case that the box connection mechanism is located at the first position, two sides of the bottom frame 2221 lap on the first fixation bracket 211 and the second fixation bracket 212, respectively. The vertical frame 2222 is located at a side of the bottom frame 2221 away from the first fixation rack and the second fixation rack. For example, the vertical frame 2222 is arranged vertically at a side of the bottom frame 2221 in the second direction. The vertical frame 222 is configured to be connected with the control box.

For example, the bottom frame 2221 includes two longitudinal rods and two transverse rods. The two longitudinal rods are arranged in the direction X and extend in the direction Y. The two transverse rods are arranged in the direction Y and extend in the direction X. The two transverse rods are located between the two longitudinal rods. The two transverse rods and the two longitudinal rods form a structure having a shape of "II". In a case that the box connection mechanism is located at the first position, the two longitudinal rods can lap on the first fixation bracket 211 and the second fixation bracket 212, respectively.

For example, the vertical frame 222 includes two vertical beams connected with two sides of the bottom frame respectively and a transverse beam connected between the two vertical beams. For example, the two vertical beams are arranged in the direction X and extend in the direction Z. Bottom ends of the two vertical rods are connected with the two longitudinal rods of the bottom frame 2221, respectively; two ends of the transverse rod are connected with top ends of the two vertical beams, respectively; and the two vertical beams and the transverse beam form a structure having a shape of gate arranged above the bottom frame 2221.

For example, the support frame 222 further includes a first vertical rod 2223 and a second vertical rod 2224 connected with both sides of the vertical frame, respectively. The first vertical rod 2223 and the second vertical rod 2224 can be connected with two sides of the transverse beam, respectively. Both of the first vertical rod 2223 and the second vertical rod 2224 extend in the second direction. The support frame 222 can include one or more first vertical rods 2223 and one or more second vertical rods 2224. The one or more first vertical rods 2223 are arranged on one side of the transverse beam, and the one or more second vertical rods 2224 are arranged on the other side of the transverse beam.

For example, a first end of the rotation shaft 221 is fixedly connected with the support frame 222, a second end of the rotation shaft 221 extends in the second direction relative to the first end of the rotation shaft 221 (a connection line of the second end of the rotation shaft 221 and the first end of the rotation shaft 221 is parallel with the second direction), and the rotation shaft 221 is rotatably connected with the fixation shaft 213. For example, the bottom end of the rotation shaft 221 is connected with a longitudinal rod of the bottom frame 2221, and the top end of the rotation shaft 221 extends upward in the direction Z, so that the rotation shaft 221 is arranged vertically above the bottom frame 2221. The rotation shaft 221 is rotatably connected with the fixation shaft 213, for example, by a hinge etc., so that the rotation shaft 221 can rotate around the fixation shaft 213.

Figure 6:
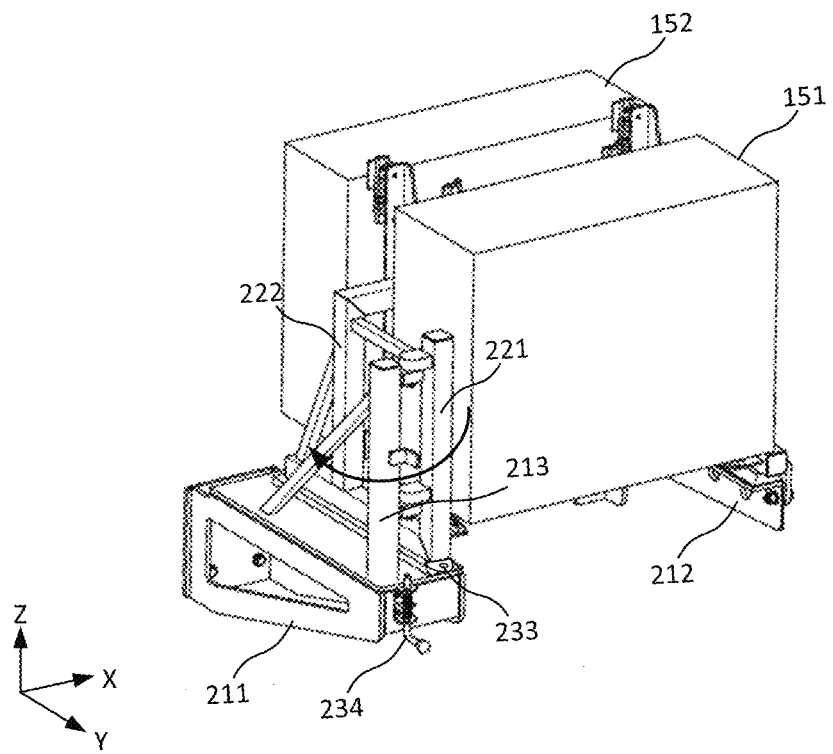
FIG. 6 illustrates a prospective schematic diagram of a control box and a connecting apparatus from a first angle of view according to at least one embodiment of the present disclosure.
Figure 7:
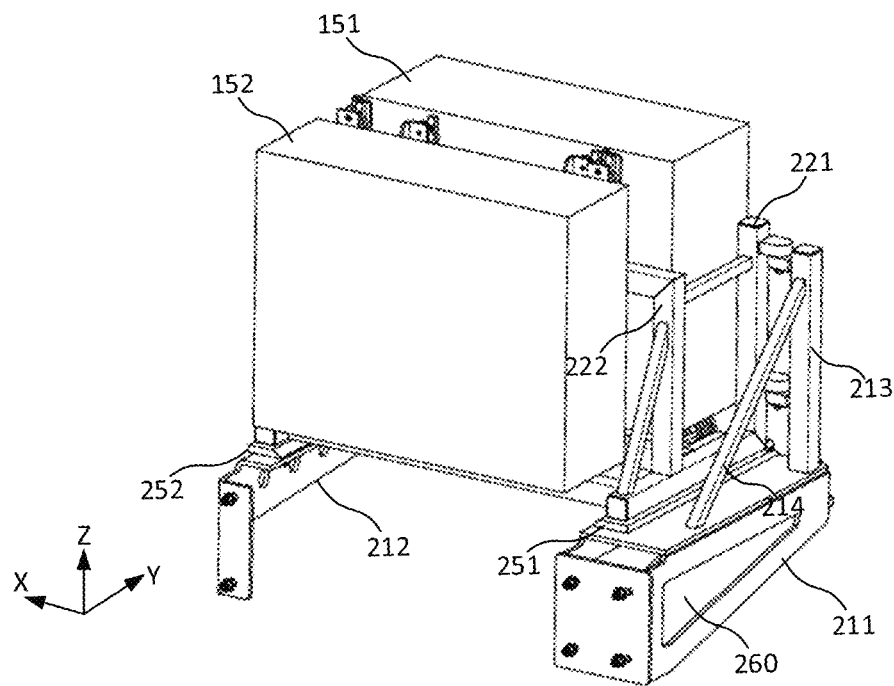
FIG. 7 illustrates a prospective schematic diagram of the control box and the connection device from a second view of angle according to at least one embodiment of the present disclosure.
Figure 8:
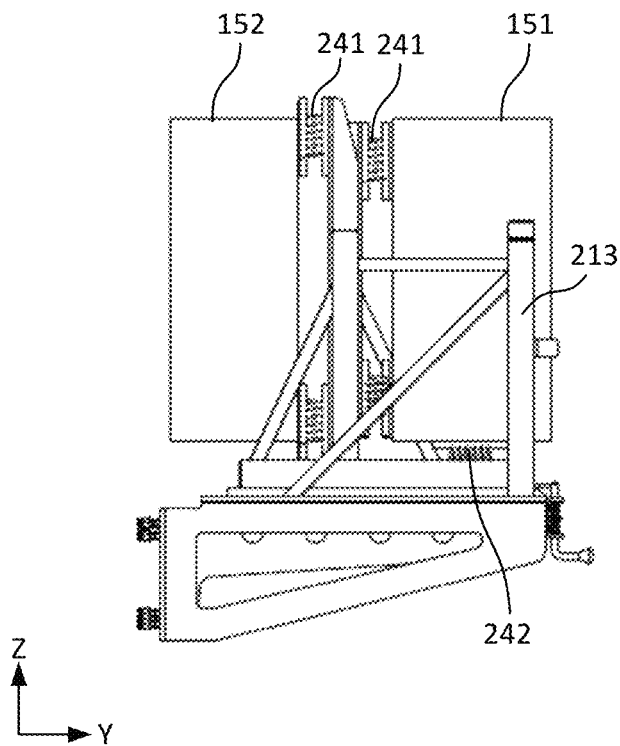
FIG. 8 illustrates a schematic side view of the control box and the connection device according to at least one embodiment of the present disclosure.
Figure 9:
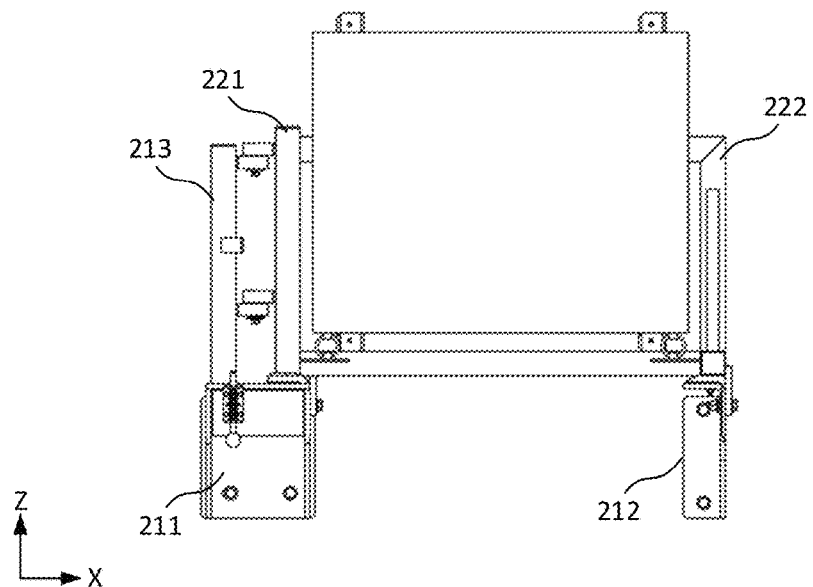
FIG. 9 illustrates a schematic front view of the control box and the connection device according to at least one embodiment of the present disclosure.

FIG. 6 illustrates a prospective schematic diagram of the control box and the connection device from a first angle of view according to at least one embodiment of the present disclosure. FIG. 7 illustrates a prospective schematic diagram of the control box and the connection device from a second view of angle according to at least one embodiment of the present disclosure. FIG. 8 illustrates a schematic side view of the control box and the connection device according to at least one embodiment of the present disclosure. FIG. 9 illustrates a schematic front view of the control box and the connection device according to at least one embodiment of the present disclosure.

As illustrated in FIGS. 5 to 9, for example, the control box includes a first control box 151 and a second control box 152. The first control box 151 and the second control box 152 are connected with both sides of the vertical frame 2222, respectively. The first vertical rod 2223 is configured to connect with the first control box 151, and the second vertical rod 2224 is configured to connect with the second control box 152. In the states as illustrated in FIGS. 6 to 9, the control box is located at the first position.

Figure 10:
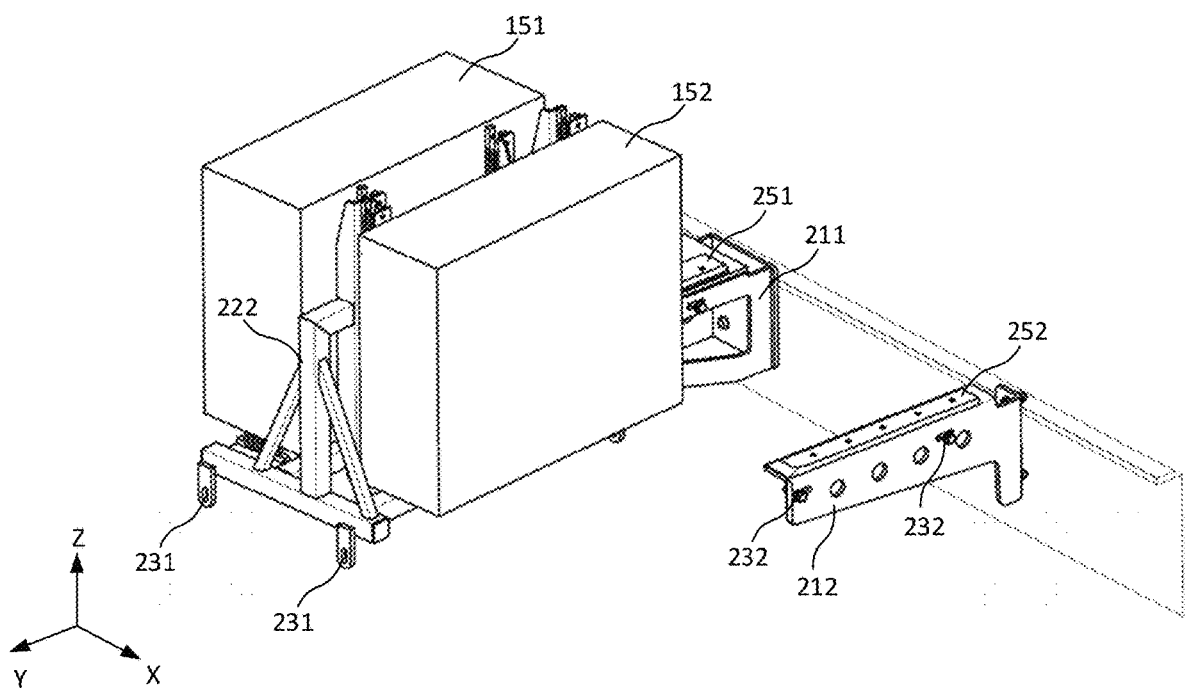
FIG. 10 illustrates a schematic diagram of the control box rotated to the second position according to at least one embodiment of the present disclosure.

FIG. 10 illustrates a schematic diagram of the control box rotated to the second position according to at least one embodiment of the present disclosure.

As illustrated in FIG. 10, under the rotation cooperation of the fixation shaft 213 and the rotation shaft 221, the box connection mechanism can rotate around the rotation shaft 221. Since the control box is connected with the box connection mechanism, the box connection mechanism can drive the control box to rotate around the rotation shaft 221 together, so that the control box is rotated along the arrow from the first position of the control box as illustrated in FIG. 6 to the second position of the control box as illustrated in FIG. 10 to form an operation space at the original first position.

For example, the fixation shaft 213 is located at the second end of the first fixation bracket 211. As illustrated in FIGS. 5 and 6, the fixation shaft 213 is located at the front end of the first fixation bracket 211. Based on this arrangement, the control box can have a forward movement tendency during the rotation process, that is, the control box rotates towards a lateral and forward direction, which can avoid interference between the control box and other mechanisms located on the side of the first fixation bracket 211.

For example, as illustrated in FIG. 10, the connection device further includes a first limitation component. The first limitation component includes a first limitation structure 231 and a second limitation structure 232. The first limitation structure 231 is disposed on the support frame, and the second limitation structure 232 is disposed on the second fixation bracket 212. For example, a connection piece is disposed on the bottom frame of the support frame, and the first limitation structure 231 can be a first through hole provided in the connection piece. The second limitation structure 232 can be a second through hole provided in the second fixation bracket 212. The first limitation component can further include a pin that matches the first through hole and the second through hole in size.

Figure 11:
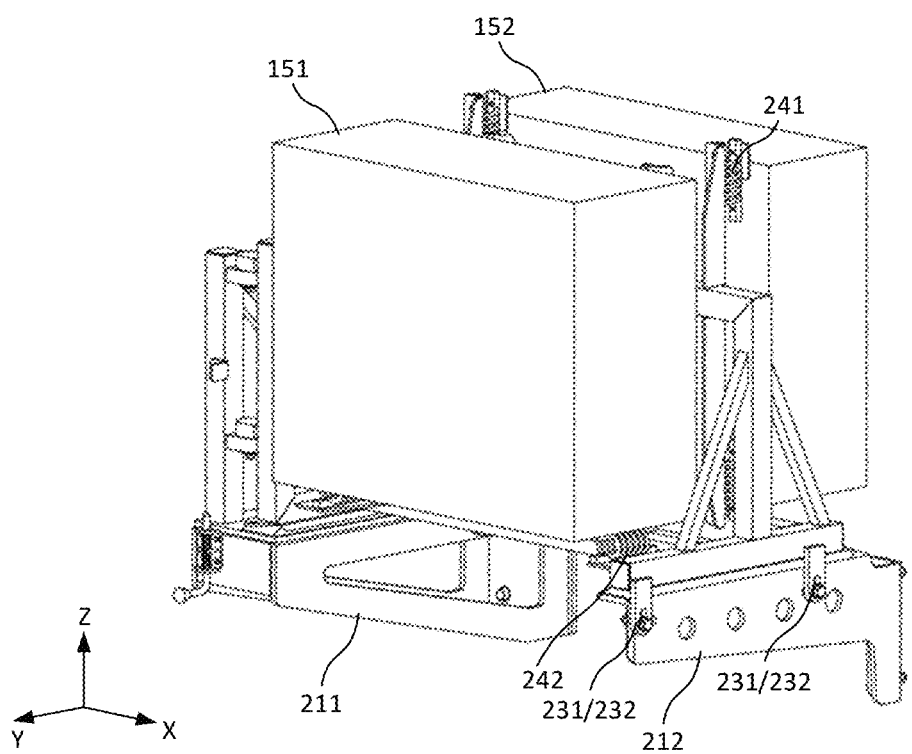
FIG. 11 illustrates a schematic diagram of the control box rotated back to the first position according to at least one embodiment of the present disclosure.

FIG. 11 illustrates a schematic diagram of the control box rotated back to the first position according to at least one embodiment of the present disclosure.

As illustrated in FIG. 11, in a case that the control box is located at the first position, the first limitation structure and the second limitation structure cooperate with each other to lock the control box at the first position. For example, in a case that the control box is located at the first position, the first through hole is aligned with the second through hole, and the pin can be plugged into the aligned first through hole and second through hole to prevent the box connection mechanism from moving, to further prevent the control box from moving and lock the control box at the first position.

For example, as illustrated in FIG. 6, the connection device further includes a second limitation component. The second limitation component includes a third limitation structure 233 and a fourth limitation structure 234. The third limitation structure 233 is disposed on the support frame 222. The fourth limitation structure 234 is disposed on the first fixation bracket 211. The third limitation structure 233 and the fourth limitation structure 234 cooperate with each other to lock the control box at the second position. For example, the third limitation structure 233 can be a third through hole provided in the bottom frame of the support frame 222, and the fourth limitation structure 234 can be a pin 234 provided on the first fixation bracket 211. After the box control mechanism drives the control box to rotate to the second position, the third through hole is aligned with the pin 234, and the pin 234 can be inserted into the third through hole to prevent the box connection mechanism from moving, prevent the control box from moving and lock the control box at the second position.

For example, as illustrated in FIGS. 5, 8 and 11, the connection device further includes at least one shock absorber, and the at least one shock absorber is configured to be connected between the support frame and the control box. The at least one shock absorber includes a first shock absorber 241 and a second shock absorber 242. The first shock absorber 241 is configured to be connected between the first vertical rod 2223 and the first control box 151 and/or connected between the second vertical rod 2224 and the second control box 152. For example, at least one first shock absorber 241 is provided between the first control box 151 and each first vertical rod 2223, and at least one first shock absorber 241 is also provided between the second control box 152 and each second vertical rod 2224. The first shock absorber 241 can buffer an impact force, thereby reducing the shock of the first control box 151 and the second control box 152.

For example, the second shock absorber 242 is configured to be connected between the bottom frame and the control box. At least one second shock absorber 242 can be provided at both the bottom of the first control box 151 and the bottom of the second control box 152 to further reduce the shock of the first control box 151 and the second control box 152.

For example, the shock absorber includes a vibration isolator. The first shock absorber 241 and the second shock absorber 242 can be implemented as spring vibration isolators or rubber vibration isolators.

For example, as illustrated in FIGS. 7 and 10, the surface (for example, the upper surface) of the first fixation bracket 211 towards the second direction (the direction Z) is provided with a first pad plate 251, and the first pad plate 251 is configured to be lapped with the bottom frame of the support frame 222. For example, in a case that the control box is located at the first position, the bottom frame of the support frame 222 can lap on the first pad plate 251. The first pad plate 251 extends in the first direction (the direction Y). A thickness of a side of the first pad plate 251 facing the second fixation bracket 212 is less than a thickness of a side of the first pad plate 251 away from the second fixation bracket 212, to form a first inclined surface on the first pad plate 251. In the view of angle as illustrated in FIG. 10, a thickness of the left side of the first pad plate 251 is larger than a thickness of the right side of the first pad plate 251, to form an inclined surface with a high left side and a low right side.

For example, as illustrated in FIGS. 7 and 10, the surface (for example, the upper surface) of the second fixation bracket 212 towards the second direction is provided with a second pad plate 252, and the second pad plate 252 is configured to be lapped with the bottom frame of the support frame 222. For example, in a case that the control box is located at the first position, the bottom frame of the support frame 222 can lap on the second pad plate 252. The second pad plate 252 extends in the first direction (the direction Y), and a thickness of a side of the second pad plate 252 close to the first end (for example, the rear end) of the second fixation bracket is larger than a thickness of a side of the second pad plate 252 close to a second end (for example, the front end) of the second fixation bracket, to form a second inclined surface on the second pad plate. For example, in the view of angle as illustrated in FIG. 10, a thickness of the front end of the second pad plate 252 is less than a thickness of the rear end of the second pad plate, to form an inclined surface with a low front and a high rear.

For example, in a case that the control box is located at the second position, due to the gravity, a side of the box connection mechanism away from the rotation shaft 213 would sink to a certain extent. During the control box being rotated from the second position back to the first position, the first inclined surface on the first pack plate 251 and the second inclined surface on the second pad plate 252 facilitate the box connection mechanism to smoothly rotate back to the first position.

For example, as illustrated in FIG. 7, the first fixation bracket 211 is provided with a via hole 260 running through the first fixation bracket 211 in the direction of the axis of the transmission shaft (the direction X), for a cable passing through the via hole to connect with the control box.

Another embodiment of the present disclosure further provides a control box component. The control box component includes a control box and the connection device of any one of the foregoing embodiments. In a state of the fracturing apparatus in a normal operation, the control box component can make the control box to locate at the first position, so that respective parts of the fracturing apparatus are more compact. In a case that the transmission component is required to be maintained, the control box can be moved to the second position, so that a region is empty as an operation space at a side of the transmission component, which is convenient for an operator to maintain the transmission component in the operation space.

Another embodiment of the present disclosure further provides a fracturing apparatus, including a mounting base, a transmission component, a control box, and the connection device of any of the foregoing embodiments.

For example, the fracturing apparatus can be as illustrated in FIG. 1. The transmission component includes a transmission shaft 130 and a transmission shaft mask. The control box 150 is connected with the mounting base (not illustrated in FIG. 1) by the connection device. In addition, the fracturing apparatus can further include a bottom skid 160, an exhaust muffler 171, a muffler cabin 172, an air intake cabin 180, a radiator 190 and other devices.

For example, in a state of the fracturing apparatus in a normal operation, the control box is located at the first position, so that the respective parts of the fracturing apparatus are more compact. In a case that the transmission component is required to be maintained, the control box can be moved to the second position, so that a region is empty as an operation space at a side of the transmission component, which is convenient for an operator to maintain the transmission component in the operation space.

Since a turbine engine can directly use natural gas as fuel and has the advantages of small size, light weight, high power density, etc., driving by a turbine engine, compared to by a diesel engine, facilitates a reduction of the size of the fracturing device and has the advantages of improved environmental protection, high driving efficiency, etc. Moreover, the power supply demand in a fracturing operation site can be reduced when a turbine engine is used for driving the fracturing system compared to directly using an electric motor for driving. In addition, the turbine engine further has the advantages of small size, light weight, high power density and the like.

In another aspect, the turbine engine generates power through the rotation of an impeller driven by a flow of flow of combusted substance. Therefore, it is necessary to keep the impeller and blades of the turbine engine clean and prevent device breakdown due to disruption in the balance of the impeller or damage of the impeller caused by impurities. In at least one embodiment, a cleaner is directly driven by electric power, i.e., by an electric motor, so that the space occupied by the cleaner can be effectively reduced, and it is convenient to place the cleaner below the turbine engine. For example, the highest point of the cleaner is below the lowest point of the turbine engine. Such an arrangement may prevent the cleaner from shielding the turbine engine in the height direction, thereby facilitating the maintenance of the turbine engine.

In another examples, the cleaner may also be driven pneumatically or hydraulically. The driving mode of the cleaner is not limited by the embodiments of the present disclosure.

Figure 12:
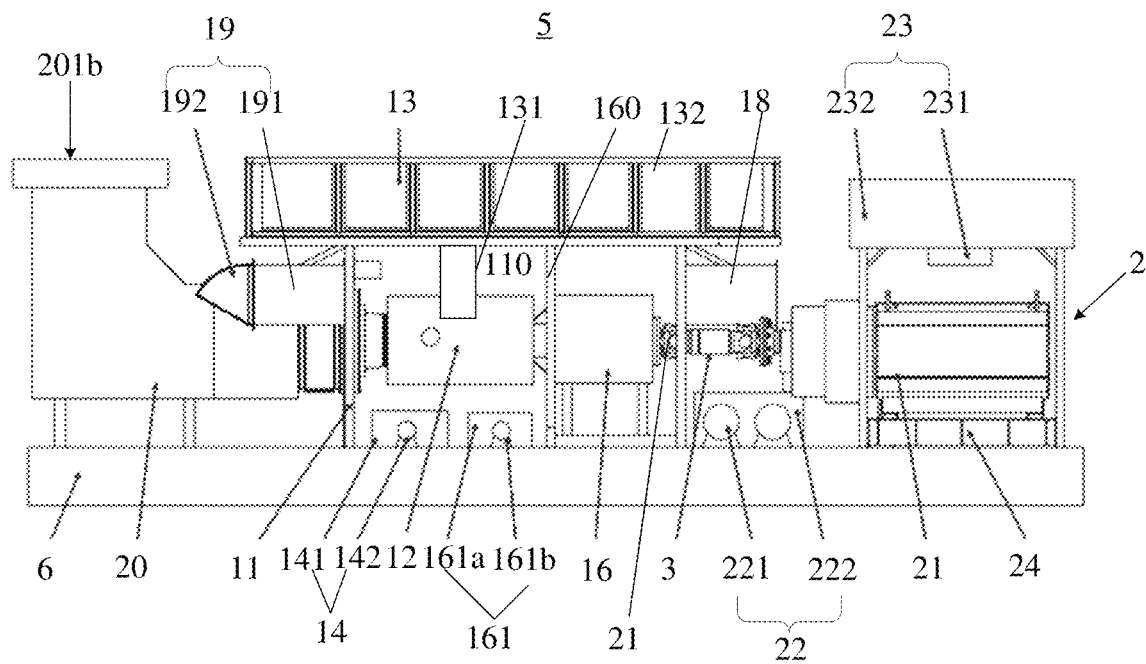
FIG. 12 is a structural schematic diagram of an example fracturing device according to at least one embodiment of the present disclosure.

FIG. 12 is a structural schematic diagram, for example, a side view, of an example fracturing device according to at least one embodiment of the present disclosure.

As shown in FIG. 12, the fracturing device 2-5 includes a power unit. The power unit includes a muffling compartment 2-11, a turbine engine 2-12, an air intake unit 2-13 and a cleaner 2-14.

The muffling compartment 2-11 has an accommodation space 2-110, and the turbine engine 2-12 and the cleaner 2-14 are located within the accommodation space 2-110. For example, a muffler such as soundproof sponge or a muffler plate is disposed on the inner wall of the muffling compartment.

The air intake unit 2-13 is located at the top of the muffling compartment 2-11 and communicated with the turbine engine 2-12 through an intake pipe 2-131, and the air intake unit 2-13 is configured to provide a combustion-supporting air (alternatively referred to as combustion air, combustion-supporting gas, and the like) to the turbine engine 2-12. For example, the air intake unit 2-13 includes an intake filter and an intake muffler, and the intake muffler has one end connected to the intake filter and another end communicated with the intake pipe 2-131.

For example, the air intake unit 2-13 comprises a plurality of intake cabins 2-132 arranged side by side. The plurality of intake cabins 2-132 help to enlarge the size of the air intake unit 2-13, thus providing a high gas capacity to increase the power of the turbine engine 2-12. The intake cabins 2-132 also help to reduce the resistance of air intake and exhaust, thereby being conducive to prolonging the service life of the turbine engine.

For example, the air intake unit 2-13 extends beyond the range of the muffling compartment 2-11 in the axial direction of the turbine engine, helping to enlarge the size of the intake cabins and protect (e.g., keep out the rain) the structure (e.g., an air inlet assembly and an air outlet assembly as described below) thereunder. It should be noted that the mentioned axial direction of the turbine engine may be the extension direction of a transmission shaft or an output shaft in the turbine engine.

The air intake unit 2-13 is fixed to the top of the muffling compartment 2-11, for example, by welding.

For example, the cleaner 2-14 is located at the side, away from the air intake unit 2-13, of the turbine engine 2-12, i.e., below the turbine engine. For example, the cleaner 2-14 may be located directly or obliquely below the turbine engine 2-12. For example, the cleaner 2-14 includes a water tank 2-141 and a cleaning pump 2-142. For example, the cleaner 2-14 is electrically driven, and the space used by the cleaner can thus be reduced. In another examples, the cleaner may be driven by an air compressor which is located, for example, outside the muffling compartment. The air compressor may be driven electrically, for example. In further another examples, the cleaner may be driven by a hydraulic system which may be driven electrically for example.

For example, the power unit further includes a starter located within the muffling compartment 2-11 and configured to start the turbine engine 2-12.

Figure 13:
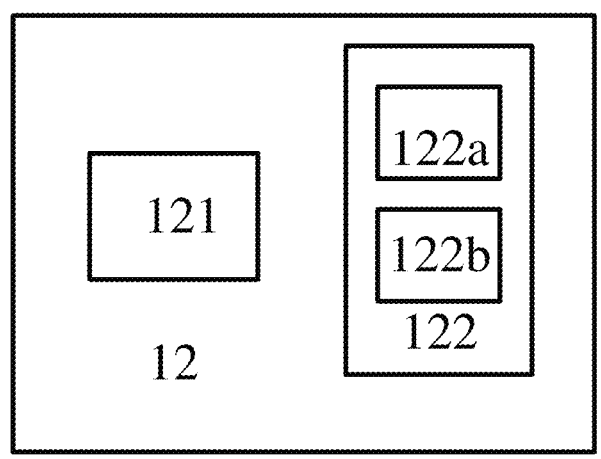
FIG. 13 is a structural schematic diagram of an example turbine engine according to at least one embodiment of the present disclosure.

For example, the starter includes an electric motor. For example, the electric motor is configured to directly start the turbine engine 2-12, i.e., the turbine engine is started electrically. In this case, for example, as shown in FIG. 13, the starter 13-121 is integrated into the turbine engine.

The electric power needed to start the turbine engine is far less than that directly used to drive a fracturing pump unit, thus reducing the power supply demand in the fracturing work site.

In another examples, the turbine engine 2-12 includes a hydraulic system. The electric motor in the starter is configured to drive the hydraulic system to start the turbine engine, i.e., the hydraulic system is driven electrically. For example, the electric motor is located at the side, away from the air intake unit, of the turbine engine 2-12.

Compared with a diesel-driven hydraulic system, the electric motor takes up only small space and thus can be placed below the turbine engine.

For example, the hydraulic system includes a hydraulic pump, a hydraulic motor, various valves, a hydraulic oil reservoir, a hydraulic oil radiator, etc. For example, the hydraulic system is configured to be driven by the electric motor to drive a fuel pump, a starting motor and so on of the turbine engine 2-12, thereby starting the turbine engine 2-12.

For example, the power unit further includes a first lubricating system 13-122 configured to lubricate the turbine engine 2-12. FIG. 13 schematically shows a diagram of the turbine engine 2-12. As shown in FIG. 2, the first lubricating system 2-122 is integrated into the turbine engine 2-12.

The first lubricating system 2-122 includes a first lubricating oil reservoir 2-122a and a first driving mechanism 2-122b. The first driving mechanism includes an electric motor, that is, the first lubricating system is driven electrically.

For example, as shown in FIG. 12, the power unit further includes a deceleration mechanism 2-16 and a second lubricating system 2-161 which are located within the muffling compartment 2-11. The second lubricating system 2-161 is configured to lubricate the deceleration mechanism 2-16. The deceleration mechanism 2-16 is connected to an output shaft of the turbine engine 2-12, and the deceleration mechanism 2-16 and the turbine engine 2-12 are arranged along the axial direction of the turbine engine 2-12.

The second lubricating system 2-161 includes a second lubricating oil reservoir 2-161a and a second driving mechanism 2-161b. The second driving mechanism 2-161b includes an electric motor, i.e., the second lubricating system 2-161 is driven electrically and thus can have a small size.

For example, as shown in FIG. 12, the second lubricating system 2-161 is located at the side, away from the air intake unit 2-13, of the turbine engine 2-12, for example, below the turbine engine 2-12. For example, the second lubricating system 2-16 and the cleaner 2-14 are arranged along the axial direction of the turbine engine 2-12, and the second lubricating system 2-16 is closer to the deceleration mechanism 2-16 than the cleaner 2-14, thus facilitating the lubrication of the deceleration mechanism 2-16 by the second lubricating system 2-161.

The muffling compartment is a relatively closed cabin. The operation of the turbine engine 2-12 can easily result in a high temperature or natural gas leakage within the muffling compartment and the danger is concealed, which may result in lagging danger judgment in human inspection without reliable guarantee for the safety of the personnel and the device.

For example, the power unit further includes a firefighting or fire-protection or fire prevention system. The firefighting system may realize advance warning on the danger within the muffling compartment. Moreover, in at least one example, the firefighting system may automatically extinguish fire within the muffling compartment 2-11, thus greatly improving the reliability of device operation and the safety of the personnel.

Figure 14A:
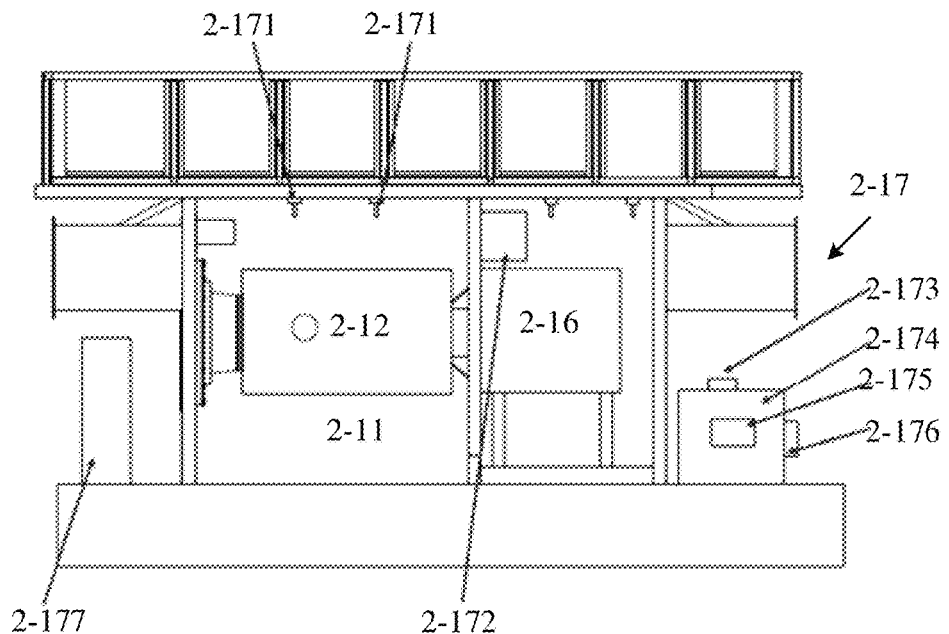
FIG. 14A is a structural schematic diagram of an example firefighting system according to at least one embodiment of the present disclosure.

FIG. 14A is a schematic diagram of an example firefighting system according to at least some embodiments of the present disclosure. For the sake of clarity, some components of the fracturing device are omitted from FIG. 14A.

As shown in FIG. 14A, the firefighting system 2-17 includes at least one firefighting detector 2-171 and a firefighting material generator 2-172 which are located within the muffling compartment 2-11. The firefighting detectors 2-171 may include, but not be limited to, a temperature detector, a smoke detector, a flame detector, a combustible gas detector, etc. In the case where a plurality of types of firefighting detectors are used, the number of the firefighting detector of each type would not be limited too.

The firefighting material generator 2-172 is filled with a firefighting material. For example, the firefighting material includes an aerosol. Compared with the traditional dry powder material, the aerosol in an equal volume can have a better fire extinguishing performance. Therefore, a container for the aerosol needs a smaller space and thus can be easily disposed within the muffling compartment 2-11.

As shown in FIG. 14A, the firefighting system 2-17 includes a plurality of firefighting detectors 2-171 disposed at the top of the muffling compartment 2-11 for detection at different positions within the muffling compartment 2-11. For example, the firefighting detectors 2-171 are disposed directly above the turbine engine 2-12 and the deceleration mechanism 2-16, respectively. The firefighting detectors 2-171 can be the same or different in type. The firefighting material generator 2-172 is disposed on a support column 2-160 between the turbine engine 2-171 and the deceleration mechanism 2-16.

For example, the firefighting system 2-17 further includes an alertor 2-173, a controller 2-174, a firefighting monitor 2-175 and an emergency switch 2-176 which are located outside the muffling compartment 2-11. The controller 2-174 is in signal connection (e.g., communication connection) with the alertor 2-173, the turbine engine 2-171 and the firefighting material generator 2-172 respectively. In the case where an anomaly (e.g., that at least one of temperature, smoke consistency, combustible gas concentration in the muffling compartment 2-11 is above a threshold value, or a flame is generated) is detected by the firefighting detector 171, the controller 2-174 is triggered to control the firefighting material generator 2-172 to start automatically and eject the firefighting material and simultaneously control the alertor 173 to give an alerting signal.

For example, the firefighting system 2-17 further includes a hand fire extinguisher 2-177 located outside the muffling compartment, allowing the personnel on the spot to extinguish fire manually. For example, the hand fire extinguisher 2-177 may be a dry powder fire extinguisher.

Figure 14B:
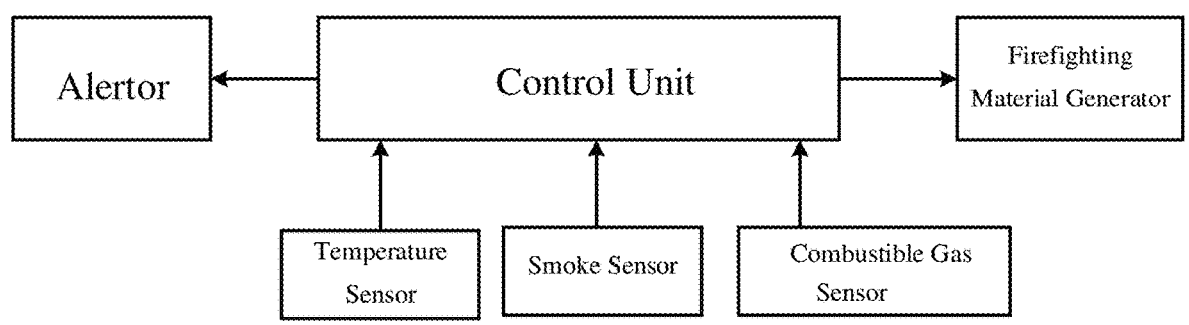
FIG. 14B is a structural schematic diagram of an example firefighting system according to some other embodiments of the present disclosure.

FIG. 14B is a schematic diagram of a firefighting system in a fracturing device according to another example of the present disclosure. As shown in FIG. 14B, the firefighting system includes a control unit, an alertor, a firefighting material generator, a plurality of temperature sensors, a plurality of smoke sensors and a plurality of combustible gas sensors. The control unit is in signal connection with the alertor, the firefighting material generator, the temperature sensors, the smoke sensors and the combustible gas sensors respectively.

For example, the control unit is configured to control the plurality of temperature sensors to detect the temperature simultaneously at different positions within the compartment of the turbine engine and generate a temperature data set from the obtained temperature data. The operation is repeated cyclically and the temperature data sets are output, thus realizing the detection of the temperature in the compartment.

For example, the control unit is further configured to control the plurality of smoke detectors to detect the smoke simultaneously at different positions within the compartment of the turbine engine and generate a smoke data set from the obtained smoke data. The operation is repeated cyclically and the smoke data sets are output, thus realizing the detection of the smoke in the compartment.

For example, the control unit is further configured to control the plurality of combustible gas sensors to detect the concentration of the combustible gas simultaneously at different positions within the compartment of the turbine engine and generate a combustible gas data set from the obtained combustible gas concentration data. The operation is repeated cyclically and the combustible gas data sets are output, thus realizing the detection of the combustible gas in the compartment. The combustible gas includes, for example, methane.

For example, the control unit is further configured to, in response to a preset temperature threshold value, cyclically determine whether more than half of temperature data in the temperature data sets is above the temperature threshold value, output fire information if yes, and output alert information if no, where the alert information contains the temperature data of the temperature above the temperature threshold value and detection positions thereof.

For example, the control unit is further configured to, in response to a smoke threshold value input from the outside, cyclically determine whether more than half of smoke data in the smoke data sets is above the smoke threshold value, output fire information if yes, and output alert information if no, where the alert information contains the smoke data of the smoke above the smoke threshold value and detection positions thereof.

For example, the control unit is further configured to, in response to a combustible gas concentration threshold value input from the outside, cyclically determine whether more than half of combustible gas concentration data in the combustible gas data sets is above the combustible gas concentration threshold value, output warning information if yes, and output alert information if no, where the alert information contains the values of combustible gas concentration above the combustible gas concentration threshold value and detection positions thereof.

For example, the control unit is further configured to, in response to the fire information, trigger the firefighting material generator to perform firefighting operation, for example, ejecting aerosol, carbon dioxide, etc., and simultaneously trigger the alertor to give an alerting signal, for example, a sound signal and/or a light signal. For example, the firefighting material generator includes a sprinkler having structures such as a nozzle, a liquid reservoir and a pipe.

For example, the control unit is further configured to recheck the detection of the combustible gas to improve the detection accuracy. For example, the control unit is configured to, in response to the fire information, determine whether the warning information is received simultaneously, carry out no operation if yes, and if no, generate an anomaly set from all combustible gas concentration data of combustible gas concentration below a combustible gas concentration threshold value and the detection positions thereof, and output the anomaly set.

The firefighting system can recheck and calibrate the combustible gas concentration sensors based on the temperature sensors and the smoke sensors, and avoid disfunction of the equipment and further improve the fire safety performance of the equipment.

For example, as shown in FIG. 12, the power unit further includes an air inlet assembly 2-18 and an air outlet assembly 2-19. The air inlet assembly 2-18 is located at one side of the turbine engine along the axial direction of the turbine engine and is communicated with the accommodation space of the muffling compartment 2-12. The air outlet assembly 2-19 is located at the other side of the turbine engine along the axial direction and disposed opposite to the air inlet assembly 8, and the air outlet assembly 2-19 is communicated with the accommodation space of the muffling compartment 2-12. The air inlet assembly 2-18 and the air outlet assembly 2-19 are configured to create a circulation environment in the muffling compartment, helping to dissipate heat from the compartment.

Figure 15A:
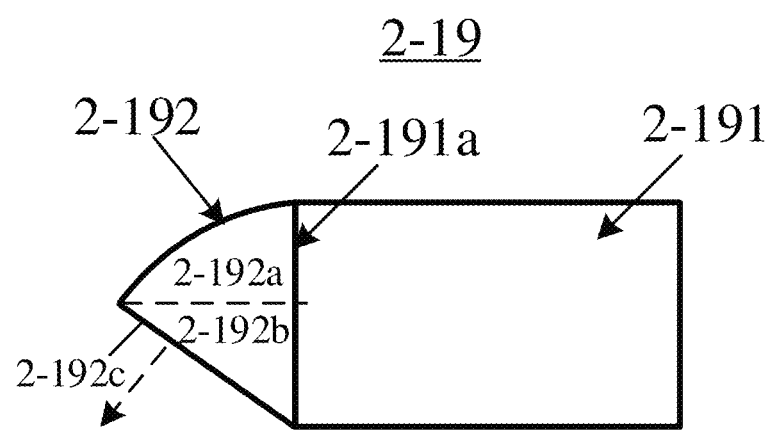
FIG. 15A is a structural schematic diagram of an example air outlet assembly according to at least one embodiment of the present disclosure.

FIG. 15A shows an enlarged schematic diagram of the air outlet assembly 2-19. For example, as shown in FIG. 15A, the air outlet assembly 2-19 includes an air outlet pipe 2-191 and a lead-out portion 2-192 connected to the air outlet pipe 2-191. The lead-out portion is configured to change an orientation of an air outlet 2-192c of the air outlet assembly, thereby effectively reducing sand wind that may enter the muffling compartment via the air outlet assembly to cause damage to the materials in the compartment.

For example, during loading or transportation of the fracturing device, the air outlet assembly 2-19 is generally closer to the front, namely the truck head, in the direction of transportation, while the air inlet assembly 2-18 is closer to the back, namely the truck tail. Thus, the fracturing device can be conveniently unloaded to carry out fracturing work after arriving at the work site. Consequently, during transportation, sand wind can easily get into the muffling compartment via the air outlet assembly 2-19.

As shown in FIG. 15A, the lead-out portion 2-192 is provided to change the orientation of the air outlet 2-192c of the air outlet assembly 2-19 from being horizontally forward (i.e., along the moving direction) to being obliquely downward, thus effectively reducing sand wind entering. The orientation of the air outlet 2-192c of the air outlet assembly 2-19 is shown by the dotted arrow in FIG. 15A. However, the orientation of the air outlet of the air outlet assembly with the lead-out portion is not limited in the embodiments of the present disclosure. In another examples, the air outlet 2-192c may be upward or oriented laterally, which is not limited in the embodiments of the present disclosure. For example, the lead-out portion 2-192 is rotatably connected to the air outlet pipe 2-191, and the orientation of the air outlet of the air outlet assembly 2-19 can be changed by rotating the lead-out portion 2-192.

As shown in FIG. 15A, for example, the lead-out portion 2-192 is in the shape of an elbow and has a cone-shaped section with a cone angle of, for example, 40°-60° (e.g., 45°).

For example, as shown in FIG. 15A, the lead-out portion 2-192 includes a shielding portion 2-192a and an air outlet portion 2-192b. The shielding portion 2-192a is configured to shield an air outlet 2-191a of the air outlet pipe 2-191 to keep out the external sand wind. The air outlet portion 2-192b is configured to exhaust the gas that flows from the air outlet pipe 2-191 into the lead-out portion 2-192. The dividing line between the shielding portion 2-192a and the air outlet portion 2-192b is shown by the dotted line perpendicular to the air outlet 2-191a of the air outlet pipe 2-191 in FIG. 15A, which actually is not necessarily present.

For example, the orthographic projection of the shielding portion 2-192a on the plane where the air outlet 2-191a of the air outlet pipe 2-191 is positioned is at least partially overlapped with the air outlet 2-191a for shielding, with an overlapping area greater than 30% of the area of the air outlet to realize effective shielding.

The lead-out portion 2-192 is structurally designed to realize shielding, which does not need extra power or control.

Figure 15B:
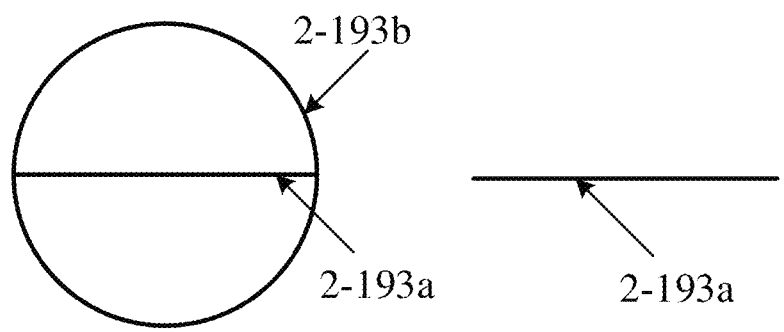
FIG. 15B is a structural schematic diagram of an example air outlet portion according to at least one embodiment of the present disclosure.

In another examples, for example, as shown in FIG. 15B, the air outlet portion 2-192b may include a revolving shaft 2-193a and a blade 2-193b disposed on the revolving shaft 2-193a. The blade 2-193b is capable of rotating around the revolving shaft, for example, under the action of an external force. For example, the revolving shaft and the blade are located at the air outlet of the air outlet portion. By rotating the blade, the air outlet portion can be opened and closed. For example, the air outlet portion may be closed during transportation and may be opened during fracturing. FIG. 15B shows a schematic diagram of the revolving shaft and the blade when the air outlet portion is closed (on the left of FIG. 15B) and opened (on the right of FIG. 15B) respectively in a direction perpendicular to the air outlet surface of the air outlet portion 2-192b.

Figure 16A:
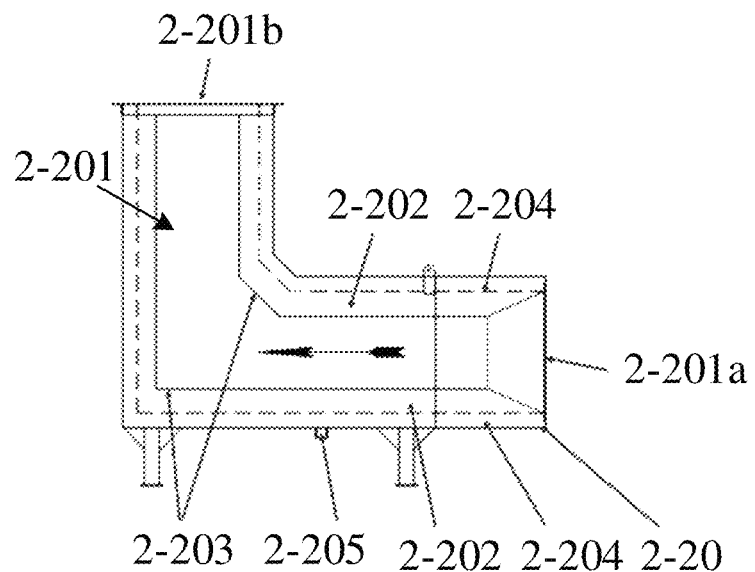
FIG. 16A is a structural schematic diagram of an example exhaust muffler according to at least one embodiment of the present disclosure.

For example, the power unit further includes an exhaust muffler which is communicated with the turbine engine 2-12 through an exhaust pipe and configured to allow the gas from the turbine engine 2-12 to be exhausted into the atmosphere after being muffled and deflected. FIG. 16A shows a structural schematic diagram of an exhaust muffler according to at least one embodiment of the present disclosure.

As shown in FIG. 16A, the exhaust muffler 2-20 includes an L-shaped gas delivery pipe 2-201. The L-shaped gas delivery pipe 2-201 has an intake port 2-201a at one end, and the intake port 2-201a is communicated with the turbine engine 2-12 through an exhaust pipe for gas intake, and the gas delivery pipe 2-201 has an upward exhaust port 2-201b at the other end, so as to exhaust the gas from the turbine engine to the atmosphere. The direction of gas delivery is shown by the arrow in FIG. 16A.

The exhaust muffler 2-20 further includes a muffling layer 2-202 disposed on the inner wall of the gas delivery pipe 2-201 to serve for muffling. Noise generated during gas delivery can be effectively reduced when the gas in the gas delivery pipe 2-201 is in contact with the muffling layer 2-202. For example, the muffling layer 2-202 includes soundproof sponge.

For example, the exhaust muffler 2-20 further includes a perforated muffler plate 2-203 located on the inner wall of the muffling layer 2-202. The perforated muffler plate 2-203 has holes to allow the gas in the delivery pipe 2-201 to be in contact with the muffling layer 2-202 for muffling.

Figure 16B:
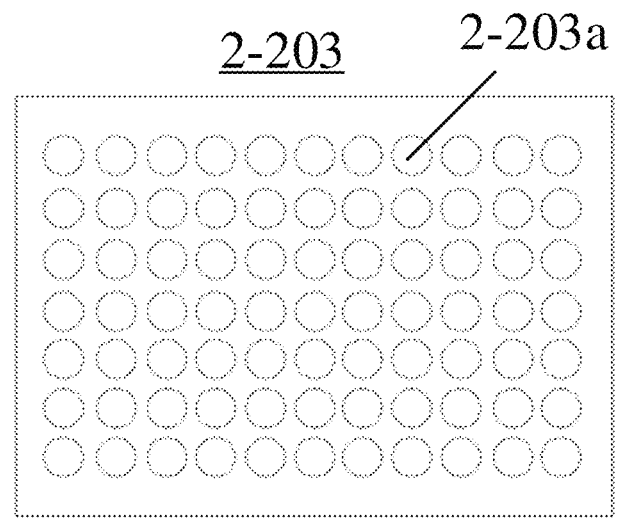
FIG. 16B is a structural schematic diagram of an example exhaust muffler plate according to at least one embodiment of the present disclosure.

FIG. 16B shows a structural schematic diagram of the perforated muffler plate 2-203. For example, the perforated muffler plate 2-203 is tubular, and FIG. 16B shows a partial schematic diagram of the perforated muffler plate 2-203.

For example, the perforated muffler plate 2-203 has a plurality of muffling holes 2-203a arranged in an array. Thus, the gas can be brought into full contact with the perforated muffler plate, and the muffling effect can be enhanced by collision between the gas and the hole walls of the perforated muffler plate 2-203. For example, the muffling hole 2-203a has a radius of 2-8 mm. The planar shape of the muffling hole is not limited in the embodiments of the present disclosure. For example, the planar shape of the muffling hole may be elongated round, oval, square, diamond, etc.

For example, as shown in FIG. 16A, the intake port 2-201a of the exhaust muffler 20 has a retracted structure. The inner diameter of the retracted structure is gradually reduced along the intake direction. The space undergoes contraction when the exhaust gas enters the gas delivery pipe 2-201, so that the gas flow direction changes rapidly, thereby improving the muffling effect.

For example, as shown in FIG. 16A, the exhaust muffler 2-20 further includes a thermal insulating layer 2-204 located between the inner wall of the exhaust muffler 2-20 and the muffling layer 2-202 to prevent a housing of the exhaust muffler from being too hot. For example, the thermal insulation design is necessary because the temperature of the exhaust gas from the turbine engine is up to 600° C.

For example, the exhaust muffler 2-20 further includes a water port 2-205 located in the bottom. For example, when water flows into the exhaust muffler 2-20, the water can be drained through the perforated muffler plate 2-203 and finally discharged via the water port 2-205.

The exhaust muffler 2-20 shown in FIG. 16A keeps the gas delivery pipe unblocked while serving for muffling, thus reducing the exhaust resistance and improving the exhaust efficiency.

Figure 16C:
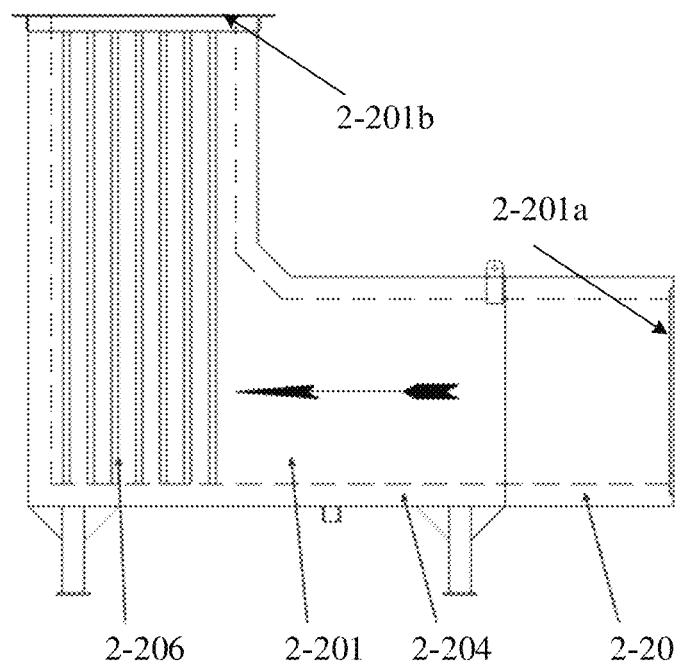
FIG. 16C is a structural schematic diagram of an example exhaust muffler according to some other embodiments of the present disclosure.

FIG. 16C is a structural schematic diagram of an exhaust muffler according to another embodiments of the present disclosure. As shown in FIG. 16C, the exhaust muffler 2-2-20 differs from the embodiment shown in FIG. 16A in that the exhaust muffler 2-20 includes a muffling barrier 2-206 to realize the noise reduction function by increasing the exhaust resistance. For example, the muffling barrier 2-206 includes a heat-resisting material to absorb noise. For example, the heat-resisting material is soundproof sponge. For example, the muffling barrier 2-206 is disposed in a branch, close to the exhaust port 2-201b, of the gas delivery pipe 2-201, and the exhaust gas entering the pipe arrives at the exhaust port 2-201b through the muffling barrier 2-206.

For example, in some examples, the air outlet of the lead-out portion 2-192 of the air outlet assembly 2-19 is oriented towards the outer surface of the exhaust muffler 2-20, so that the surface of the exhaust muffler is cooled by the exhaust gas from the air outlet assembly 2-19, thus realizing effective utilization of the exhaust gas.

Figure 20:
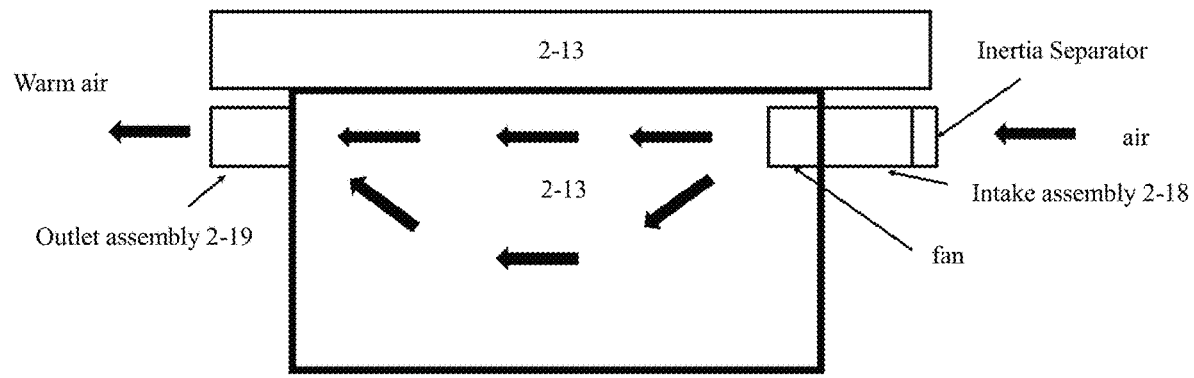
FIG. 20 illustrates an example air circulation configuration in a muffling compartment of an example turbine fracturing device.
Figure 21:
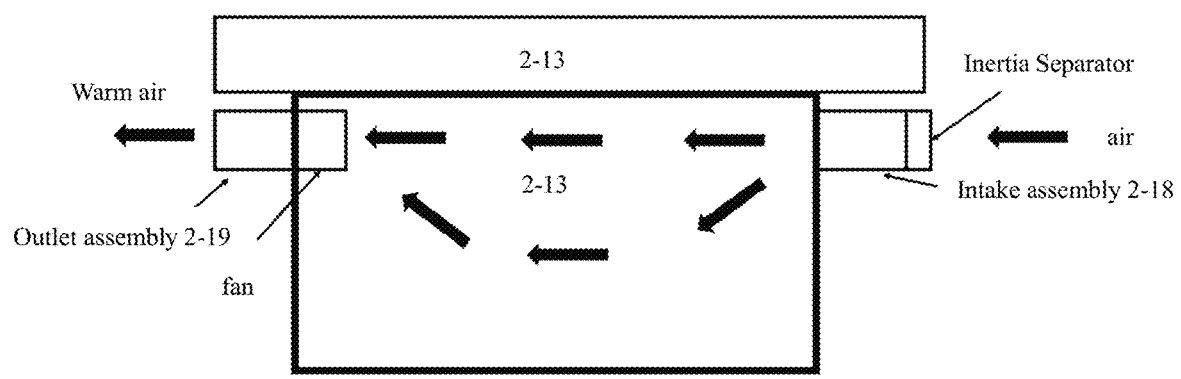
FIG. 21 illustrates another example air circulation configuration in a muffling compartment of an example turbine fracturing device.

In some example implementations, the air circulation for cooling the muffling compartment 2-11 from the air intake assembly 2-18 to the air outlet assembly 2-19 may be facilitated by controlling the inside-outside air pressure differential, as shown in FIGS. 20 and 21.

For example, as shown in FIG. 20, a fan may be installed at the air inlet assembly 2-18 for blowing cooling air from outside of the muffling compartment 2-13 through the air inlet assembly 2-18 into the muffling compartment 2-13 for create positive air pressure in comparison to the outside air pressure, which consequently pushes warm air out of the muffling compartment 2-13 through the air outlet assembly 2-19 after mixing and heat exchange of air within the muffling compartment 2-13, thereby cooling the muffling compartment 2-13 and the turbine engine therein.

For another example, as shown in FIG. 21, the fan may be disposed instead at the air outlet assembly 2-19 for pulling warm air out of the muffling compartment through the air outlet assembly 2-19, thereby forming a negative pressure within the muffling compartment assembly 2-19 compared with the outside air pressure. Because of the negative pressure, cool air outside of the muffling compartment at the air inlet assembly 2-18 is drawn into the muffling compartment for mixing and heat exchange with the air in the muffling compartment and for cooling the turbine engine therein.

In some other examples, both fans at the air intake assembly 2-18 and the outlet assembly 2-19 may be employed for increased air circulation. In some implementations, the fan(s) above may be based on electric motor(s). The power input to the electric motor(s) may be supplied in various manners (e.g., electric grid, electric generators, and the like). In some example implementations, the fan(s) may be disposed at a location of air path in the outlet or inlet assembly closer towards the muffling compartment.

As shown in FIGS. 20 and 21, in some example implementations, the air inlet assembly may also include an inertia separator at the interface of the air inlet assembly 2-18 closest to outside air source. The inertial separator may include pre-shaped air channels that help trap solid particles and/or water or other liquid droplet in the inlet air such that the amount of solid particles and water droplets entering the muffling compartment is reduced, thereby easing the burden of the cleaner system described elsewhere in this disclosure. Additional air filters may also be included after the inertia separator towards the muffling compartment along the inlet air path.

As shown in FIG. 12, the fracturing device 2-5 further includes a fracturing pump unit 2-2. The fracturing pump unit 2-2 includes a fracturing pump 2-21 which is, for example, a plunger pump. The fracturing device 2-5 further includes a transmission mechanism 2-3. For example, the transmission mechanism 2-3 includes a coupling. For example, the coupling may be in the form of a flexible coupling, a transmission shaft, a clutch, etc.

The fracturing pump unit 2-2 is connected to the power unit through the transmission mechanism 2-3, and the power unit is configured to drive the fracturing pump 2-21 to carry out fracturing work. The turbine engine 2-12, the transmission mechanism 2-3 and the fracturing pump 2-21 are disposed in the axial direction of the turbine engine in sequence, for example, coaxially, thus improving the transmission efficiency.

Figure 17:
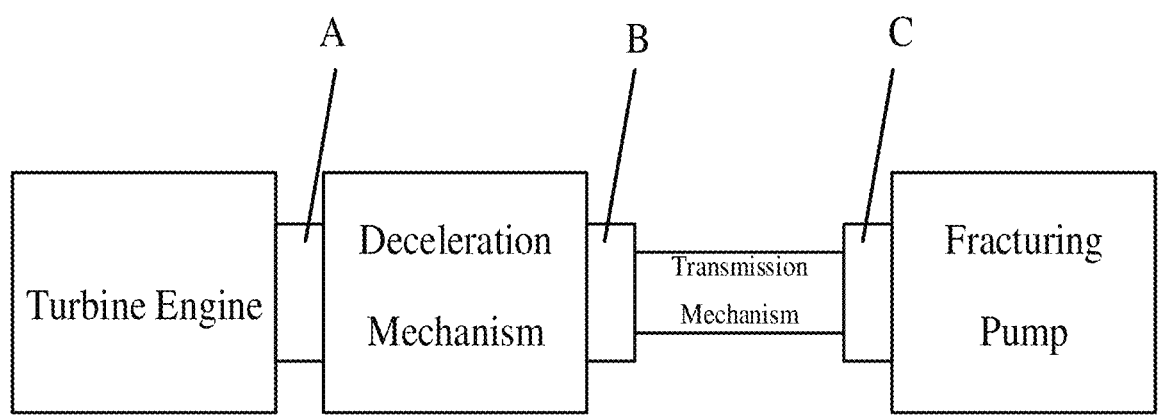
FIG. 17 is a schematic diagram of an example fracturing device according to some other embodiments of the present disclosure.

FIG. 17 is a schematic diagram of a fracturing device according to at least one embodiment of the present disclosure. As shown in FIG. 17, the turbine engine, the deceleration mechanism, the transmission mechanism and the fracturing pump are disposed in the axial direction of the turbine engine in sequence, for example, coaxially, thus improving the transmission efficiency.

For example, the fracturing device may further include a brake mechanism disposed between the turbine engine and the fracturing pump, thus realizing power cutoff between the fracturing pump and the turbine engine. For example, when the turbine engine is started, the speed is initially not high enough, and the brake mechanism may be started to prevent the pump from being driven and affecting the fracturing effect. For example, the brake mechanism may include a brake block, a brake caliper, etc.

As shown in FIG. 17, the brake mechanism may be disposed at any one or more of the position between the turbine engine and the deceleration mechanism (i.e. position A), the position between the deceleration mechanism and the transmission mechanism (i.e. position B) and the position between the transmission mechanism and the fracturing pump (i.e. position C), finally realizing cutoff between power input and output. For example, as shown in FIG. 12, the brake mechanism may be located between the deceleration mechanism 2-16 and the transmission mechanism 2-3 or integrated into the deceleration mechanism 2-16, providing a more compact integrated structure.

As shown in FIG. 12, the fracturing pump unit 2-2 further includes a third lubricating system 2-22 which is configured to lubricate the fracturing pump 2-21. The third lubricating system 2-22 includes an electric motor 2-221 and is located at the side, away from the air intake unit 2-13, of the transmission mechanism 2-3. The third lubricating system 2-22 further includes a lubricating oil reservoir 2-222.

For example, as shown in FIG. 12, the third lubricating system 2-22 is located below the transmission mechanism 2-3, thus saving space.

For example, as shown in FIG. 12, the fracturing pump unit 2-2 further includes a lubricating oil heat sink 2-23 which is configured to cool the third lubricating system 2-22.

The lubricating oil heat sink 2-23 is located above the fracturing pump 2-21, i.e., at the side, away from a base of the fracturing pump 2-21, of the fracturing pump 2-21. For example, the lubricating oil heat sink 2-23 includes an electric motor 2-231 and a radiator 2-232.

The lubricating oil heat sink 23 and the fracturing pump 21 are arranged longitudinally, providing a more compact structure.

For example, the fracturing pump unit 2-2 further includes a fracturing pump base 2-24 located below the fracturing pump 2-21 (i.e., at the side away from the air intake unit 2-13). The fracturing pump base 2-24 is configured to bolster the fracturing pump 2-21, so that the fracturing pump 2-21 and the turbine engine 2-12 are linearly arranged in the axial direction of the turbine engine 2-12, thus improving the transmission efficiency.

For example, as shown in FIG. 12, the fracturing device 2-5 further includes a bottom skid 2-6. The power unit 1 and the pump unit 2-2 are mounted on the bottom skid 2-6 to be fixed.

In the example as shown in FIG. 12, the fracturing device 2-5 is a skid-mounted device. However, this is not limited in the embodiments of the present disclosure. In another examples, the fracturing device 2-5 may also be a vehicle-mounted device or a semitrailer mounted device.

Figure 18A:
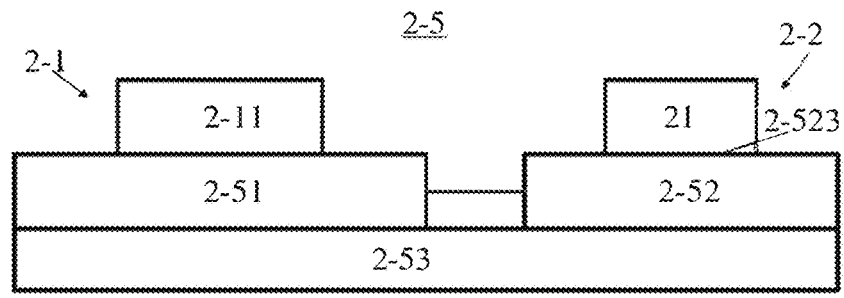
FIG. 18A is a structural schematic diagram of an example fracturing device according to still other embodiments of the present disclosure.

FIG. 18A is a schematic diagram of a fracturing device according to another embodiments of the present disclosure. As shown in FIG. 18A, the power unit further includes a power skid 2-51. The muffling compartment 2-11 is mounted on the power skid 2-51 to be fixed. The pump unit 2 further includes a pump skid 2-52. The pump skid 2-52 has a bearing surface 2-523, and the fracturing pump 2-21 is mounted on the bearing surface 2-523 of the pump skid 2-52 to be fixed. Control circuits and circuit traces for the power unit are disposed on the power skid 2-51 and control circuits and circuit traces for the pump unit 2-2 are disposed on the pump skid 2-52.

The forms of the power skid and the pump skid are not limited in the embodiments of the present disclosure. For example, the power skid/pump skid may merely include a bottom structure, or may include a bottom structure and a cage structure extending upwards. The cage structure is configured to further fix the unit mounted on the bottom structure.

For example, the power skid 2-51 and the pump skid 2-52 are detachably connected to facilitate transportation. The connection manner of the power skid 2-51 and the pump skid 2-52 is not limited in the embodiments of the present disclosure. For example, the two skids may be connected through a fastener, a connecting plate, etc.

For example, the power skid 2-51 and the pump skid 2-52 may be connected through a lug plate. One of the power skid 2-51 and the pump skid 2-52 has a single-lug plate, while the other one has a double-lug plate, and the two plates are connected through a pin shaft.

Figure 18B:
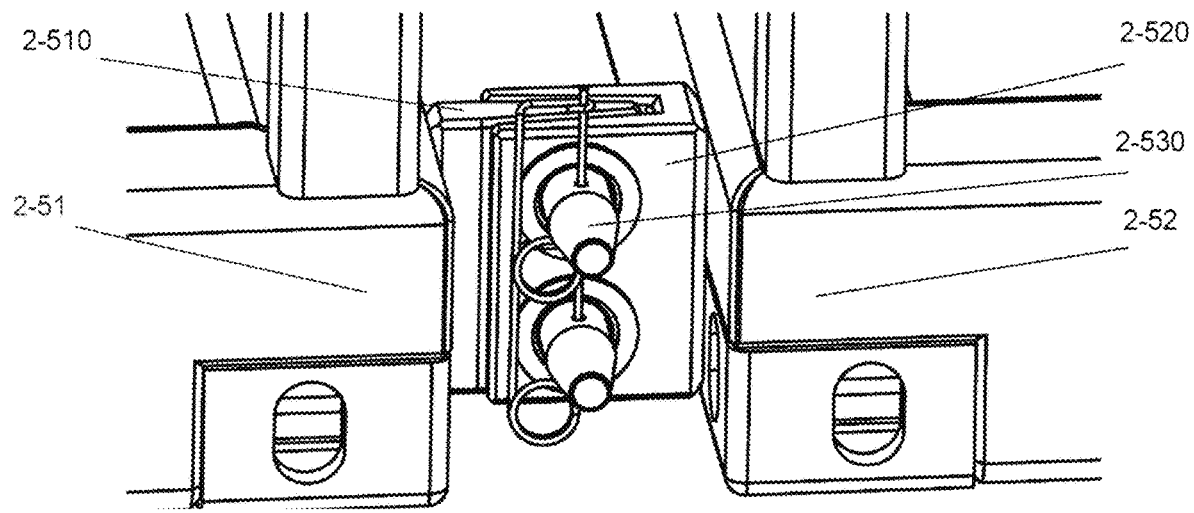
FIG. 18B and FIG. 18C are structural schematic diagrams of an example fracturing device according to further still other embodiments of the present disclosure.
Figure 18C:
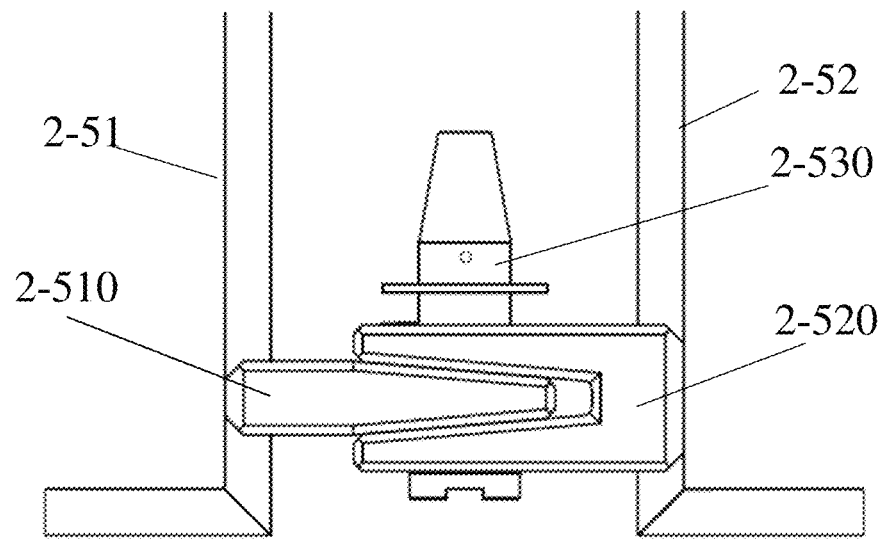

FIG. 18B shows a three-dimensional diagram of the connection between the power skid and the pump skid, and FIG. 18C shows a top view of the connection. As shown in FIG. 18B, the power skid 51 has a single-lug plate 510, while the pump skid 2-52 has a double-lug plate 2-520. The single-lug plate 2-510 is inserted into the double-lug plate 2-520. Pin holes of the two plates are aligned, and a pin shaft 2-530 is inserted into the pin holes to connect the power skid and the pump skid.

For example, the fracturing device 2-5 may further include an integrated skid 2-53. The power skid 2-51 and the pump skid 2-52 are respectively mounted on the integrated skid 2-53 to be fixed. For example, the power skid 2-51 and the pump skid 2-52 are detachably connected to the integrated skid 2-53 separately, thereby facilitating transportation.

Figure 19A:
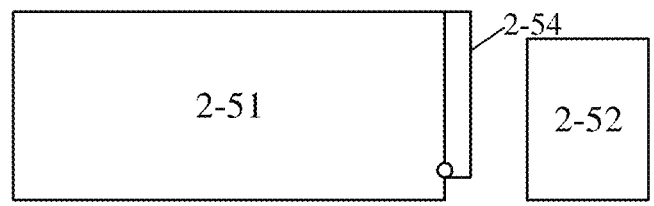
FIG. 19A and FIG. 19B are structural schematic diagrams of an example fracturing device according to still other embodiments of the present disclosure.
Figure 19B:
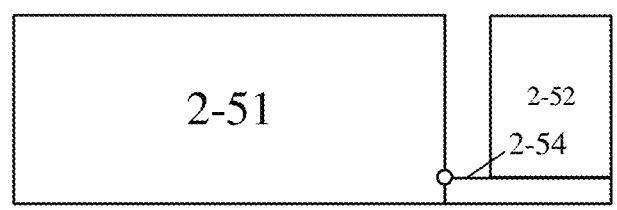

FIG. 19A and FIG. 19B are schematic diagrams of a fracturing device according to still another embodiments of the present disclosure. Unlike the embodiment shown in FIG. 18A, the power skid 2-51 includes a turnable mechanism 2-54 which is configured to be turned over to a horizontal state to carry the pump skid 2-52. For example, the pump skid 2-52 is detachably connected to the turnable mechanism 2-54. When the fracturing device is transported, the pump skid 2-52 may be removed and the turnable mechanism 2-54 may be recovered. After the arrival at the work site, the turnable mechanism 2-54 may be turned over to be horizontal and the pump skid 2-52 is mounted on the turnable mechanism 2-54. FIG. 19A and FIG. 19B show schematic diagrams of the turnable mechanism of the fracturing device being recovered and being working, respectively. For example, the power skid 2-51 may be integrated with the muffling compartment and the turbine engine and the pump skid may be integrated with the fracturing pump. For example, the turnable mechanism 2-54 may further serve to bolster the pump skid 2-52, so that the fracturing pump and the turbine engine are linearly arranged in the axial direction of the turbine engine, thus improving the transmission efficiency.

The following statements should be noted:

(1) The accompanying drawings related to the embodiments of the present disclosure involve only the structures in connection with the embodiments of the present disclosure, and other structures can be referred to common designs.

(2) In case of no conflict, features in one embodiment or in different embodiments of the present disclosure can be combined to obtain new embodiments.

The foregoing are merely exemplary embodiments of the disclosure, but is not used to limit the protection scope of the disclosure. The protection scope of the disclosure shall be defined by the attached claims.

What is claimed is:

1. A fracturing device, comprising a power unit, wherein the power unit comprises a muffling compartment, a turbine engine, an air intake unit, a circulation air inlet assembly, a circulation air outlet assembly, a control box and a transmission shaft for coupling the turbine engine and a load, wherein:
   the air intake unit is coupled with the turbine engine through an intake pipe and configured to provide a combustion-supporting air to the turbine engine;
   the muffling compartment comprises an accommodation space;
   the turbine engine is disposed within the accommodation space; and
   the control box is configured to be movable to a first position by a side of the transmission shaft and to a second position away from the transmission shaft.

2. The fracturing device according to claim 1, wherein the circulation air inlet assembly is configured to create a positive air pressure differential inside and outside the muffling compartment.

3. The fracturing device according to claim 2, wherein the circulation air inlet assembly comprises an electric fan for generating the positive air pressure differential.

4. The fracturing device according to claim 2, wherein the circulation air outlet assembly comprises an electric fan for generating a negative air pressure differential.

5. The fracturing device according to claim 2, wherein the circulation air inlet assembly comprises an inertia separator at an interface between the circulation air inlet assembly and outside air.

6. The fracturing device according to claim 1, wherein:
the power unit further comprises a starter within the accommodation space; the starter is configured to start the turbine engine and comprises an electric motor which is at the side of the turbine engine away from the air intake unit; and
the electric motor is configured to directly start the turbine engine; or, the turbine engine comprises a hydraulic system, the electric motor is configured to drive the hydraulic system to start the turbine engine.

7. The fracturing device according to claim 1, wherein:
the power unit further comprises a lubricating system configured to lubricate the turbine engine; and
the lubricating system comprises a lubricating oil reservoir and a driving mechanism, and the driving mechanism comprises an electric motor.

8. The fracturing device according claim 1, wherein:
the power unit further comprises a deceleration mechanism and a lubricating system which are within the accommodation space, and the lubricating system is configured to lubricate the deceleration mechanism;
the deceleration mechanism is connected with an output shaft of the turbine engine;
the lubricating system comprises a lubricating oil reservoir and a driving mechanism, and the driving mechanism comprises an electric motor; and
the lubricating system is at the side of the turbine engine away from the air intake unit.

9. The fracturing device according to claim 1, wherein:
the power unit further comprises a firefighting system; and
the firefighting system comprises a firefighting detector and a firefighting material generator which are within the accommodation space.

10. The fracturing device according to claim 9, wherein a firefighting material is stored in the firefighting material generator, and the firefighting material comprises an aerosol.

11. The fracturing device according to claim 1, wherein:
the circulation air inlet assembly is located at a side of the turbine engine along an axial direction of the turbine engine and coupled to the accommodation space;
the circulation air outlet assembly is located at another side of the turbine engine along the axial direction of the turbine engine and disposed opposite to the circulation air inlet assembly, and coupled to the accommodation space; and
the circulation air outlet assembly comprises an air outlet pipe and a lead-out portion connected to the air outlet pipe, and the lead-out portion is configured to change an orientation of an air outlet of the circulation air outlet assembly.

12. The fracturing device according to claim 11, wherein the lead-out portion is in a shape of an elbow.

13. The fracturing device according to claim 11, wherein:
the lead-out portion comprises a shielding portion and an air outlet portion;
the shielding portion is configured to shield an air outlet of the air outlet pipe, and the air outlet portion is configured to exhaust a gas that flows from the air outlet pipe into the lead-out portion;
an orthographic projection of the shielding portion on a plane; and
the air outlet of the air outlet pipe is located, at least partially overlap with the air outlet of the air outlet pipe, with an overlapping area greater than 30% of an area of the air outlet of the air outlet pipe.

14. The fracturing device according to claim 13, wherein the air outlet portion comprises a revolving shaft and a blade on the revolving shaft, and the blade is capable of rotating around the revolving shaft.

15. The fracturing device according to claim 1, further comprising:
a fracturing pump unit, comprising a fracturing pump; and
a transmission mechanism,
wherein:
the fracturing pump unit is connected to the power unit through the transmission mechanism, and the power unit is configured to drive the fracturing pump; and
the turbine engine, the transmission mechanism and the fracturing pump are sequentially disposed in an axial direction of the turbine engine.

16. The fracturing device according claim 15, wherein:
the power unit further comprises a power skid and the muffling compartment is mounted on the power skid;
the fracturing pump unit further comprises a pump skid having a bearing surface; and
the fracturing pump is mounted on the bearing surface of the pump skid.

17. The fracturing device according to claim 16, wherein:
the power skid is detachably connected to the pump skid; or
the fracturing device further comprises an integrated skid and the power skid and the pump skid are respectively detachably connected to the integrated skid.

18. The fracturing device according to claim 16, wherein the power skid comprises a turnable mechanism, and the turnable mechanism is configured to be turned over to a horizontal state to carry the pump skid.

19. The fracturing device according to claim 16, wherein the fracturing pump unit further comprises a lubricating oil heat sink, and the lubricating oil heat sink is at a side of the fracturing pump away from the bearing surface of the pump skid.

20. The fracturing device according to claim 15, wherein:
the fracturing pump unit further comprises a lubricating system;
the lubricating system comprises a lubricating oil reservoir and a driving mechanism, and the driving mechanism comprises an electric motor; and
the lubricating system is at a side of the transmission mechanism away from the air intake unit.

* * * * *